United States Patent
Torii et al.

(10) Patent No.: US 7,242,519 B2
(45) Date of Patent: Jul. 10, 2007

(54) RAMAN AMPLIFIER AND OPTICAL TRANSMISSION SYSTEM USING THE SAME

(75) Inventors: Kenichi Torii, Arakawa (JP); Takao Naito, Kawasaki (JP); Toshiki Tanaka, Kawasaki (JP); Masahiro Yuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 10/812,104

(22) Filed: Mar. 30, 2004

(65) Prior Publication Data

US 2004/0190120 A1 Sep. 30, 2004

(30) Foreign Application Priority Data

Mar. 31, 2003 (JP) ............... 2003-093023

(51) Int. Cl.
*H04B 10/17* (2006.01)
(52) U.S. Cl. .................. 359/334; 359/341.33
(58) Field of Classification Search ............... 359/334, 359/341.33
See application file for complete search history.

(56) References Cited

U.S. PATENT DOCUMENTS

| | | | | |
|---|---|---|---|---|
| 6,292,288 | B1 * | 9/2001 | Akasaka et al. | 359/334 |
| 6,320,695 | B1 * | 11/2001 | Tanaka et al. | 359/341.33 |
| 6,876,488 | B1 * | 4/2005 | Akasaka | 359/334 |
| 6,941,074 | B2 * | 9/2005 | Nakamura et al. | 398/92 |
| 2002/0105715 | A1 * | 8/2002 | Naito et al. | 359/334 |
| 2003/0016437 | A1 * | 1/2003 | Islam et al. | 359/334 |

FOREIGN PATENT DOCUMENTS

| | | |
|---|---|---|
| JP | 2002-229084 | 8/2002 |
| JP | 2003-057691 | 2/2003 |
| JP | 2003-198465 | 7/2003 |

OTHER PUBLICATIONS

Islam, Mohammed N. Raman amplifiers for Telecommunications. IEEE journal of selected topics in quantum electronics. vol. 8, No. 3. May/Jun. 2002. pp. 578-559.*

Y. Emori, et al., "100nm bandwidth flat gain Raman amplifiers pumped and gain-equalized by 12-wavelength-channel WDM high power laser diodes", OFC'99, PD19, 1999.

* cited by examiner

*Primary Examiner*—Jack Keith
*Assistant Examiner*—Ari M. Diacou
(74) *Attorney, Agent, or Firm*—Stass & Halsey LLP

(57) ABSTRACT

It is an object of the present invention to provide a Raman amplifier capable of easily reducing the wavelength deviation of a Raman gain while suppressing system performance degradation, and an optical transmission system using such a Raman amplifier. To this end, the Raman amplifier of the present invention supplies, to an amplification medium, first pumping lights arranged at equal wavelength spacing in a signal light wavelength band, which is shifted to a shorter wavelength side in accordance with a Raman shift frequency, and second pumping lights arranged in a wavelength band on a shorter wavelength side and a longer wavelength side than a wavelength band of the first pumping lights, the wavelength and power of which are set so that peak wavelength spacing of the Raman gain in the signal light wavelength band is substantially equal to each other, to Raman amplifies a WDM signal light, and reduces the wavelength deviation of power of the WDM signal light by using a gain equalizer having the periodicity corresponding to the peak wavelength spacing of the Raman gain.

11 Claims, 30 Drawing Sheets

RAMAN AMPLIFIER OF FIRST EMBODIMENT OF PRESENT INVENTION

MULTI-WAVELENGTHS PUMPING LIGHT SOURCE

RAMAN AMPLIFIER OF FIRST EMBODIMENT OF PRESENT INVENTION

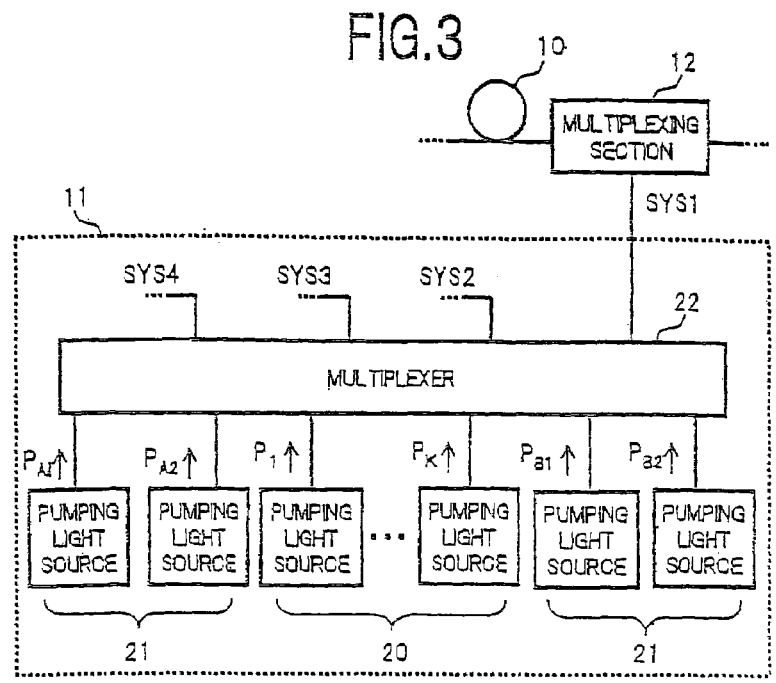
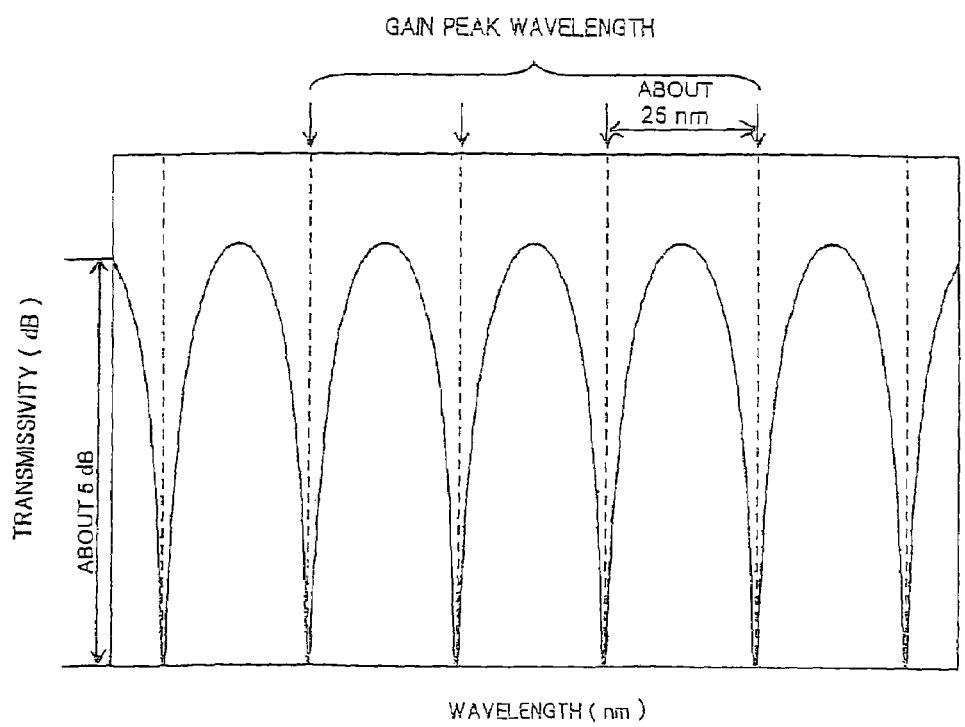

RAMAN AMPLIFIER OF THIRD EMBODIMENT OF PRESENT INVENTION

RAMAN AMPLIFIER OF FOURTH EMBODIMENT OF PRESENT INVENTION

RAMAN AMPLIFIER OF FIFTH EMBODIMENT OF PRESENT INVENTION

CONFIGURATION EXAMPLE OF CONVENTIONAL RAMAN AMPLIFIER

WAVELENGTH ALLOCATION EXAMPLE IN CONVENTIONAL RAMAN AMPLIFIER

ANOTHER CONFIGURATION EXAMPLE OF CONVENTIONAL RAMAN AMPLIFIER

ANOTHER CONFIGURATION EXAMPLE OF CONVENTIONAL RAMAN AMPLIFIER

ANOTHER WAVELENGTH ALLOCATION EXAMPLE IN CONVENTIONAL RAMAN AMPLIFIER

EXAMPLE MODULATION SYSTEM FOR PUMPING LIGHT

CHANGE IN PEAK WAVELENGTH OF TYPICAL RAMAN GAIN

EXAMPLE OF CASE WHERE PUMPING LIGHT IS ARRANGED AT UNEQUAL INTERVAL

EXAMPLE OF WAVELENGTH ALLOCATION IN WHICH SINGLE PUMPING LIGHT
IS MIXED IN SIGNAL LIGHT BAND

RAMAN EFFECT BY PUMPING LIGHT OF 1460.3 nm

EXAMPLE OF GAIN DEVIATION IN CONVENTIONAL RAMAN AMPLIFIER

TRANSMISSION LOSS WAVELENGTH CHARACTERISTIC OF TYPICAL SINGLE-MODE OPTICAL FIBER

CONFIGURATION OF RAMAN AMPLIFIER IN SEVENTH AND EIGHTH EMBODIMENTS

WAVELENGTH ALLOCATION (WAVELENGTH ALLOCATION A) IN SEVENTH EMBODIMENT

EFFECT IN EMBODIMENT

GAIN DEVIATION REDUCTION DUE TO PROVISION OF GUARD BAND

PUMPING LIGHT POWER IN THE CASE WHERE GUARD BAND IS PROVIDED

WAVELENGTH ALLOCATION 2 IN THE CASE WHERE GUARD BAND IS PROVIDED (WAVELENGTH ALLOCATION D)

GUARD BAND IS PROVIDED IN THE VICINITY OF S6, S7 AND S8

GAIN DEVIATION REDUCTION 2 DUE TO PROVISION OF GUARD BAND

RAMAN AMPLIFIER AND OPTICAL TRANSMISSION SYSTEM USING THE SAME

BACKGROUND OF THE INVENTION

1. Field of the Invention

The present invention relates to a Raman amplifier amplifying a wavelength division multiplexed signal light by utilizing a Raman effect and an optical transmission system using the same and, in particular, relates to a technique for reducing the wavelength deviation of signal light power, which occurs due to the wavelength dependence of a Raman gain.

2. Description of the Related Art

Heretofore, in a conventional long-distance optical transmission system, an optical signal has been converted into an electric signal, to be transmitted by using a regenerating repeater, which performs the reshaping, retiming and regenerating. However, as an optical amplifier has been put into practical use at present, an optical amplification-repeating transmission system using the optical amplifier as a linear repeater is considered. It is expected that, by replacing the optical regenerating repeater with the optical amplification repeater, the number of parts in the repeater shall be substantially reduced and the reliability shall be ensured while the cost of the repeater shall be remarkably reduced.

Further, as one method for realizing the large capacity of an optical transmission system, attention is focused on a wavelength division multiplexing (WDM) optical transmission system for multiplexing two ore more optical signals of different wavelengths to transmit the multiplexed signals over one optical transmission path. In a WDM optical amplification-repeating transmission system that is a combination of the WDM optical transmission system and the optical amplification-repeating transmission system, it is possible to collectively amplify two or more optical signals of different wavelengths using an optical amplifier. Therefore, a large-capacity and long-distance transmission can be realized with a simple (economical) configuration.

For the repeater in the optical amplification and repeater transmission system, an erbium doped fiber amplifier (EDFA) is generally used. For example, a gain wavelength band of the EDFA is a 1.55 μm band (C-band) and a gain wavelength band of a GS-EDFA (Gain shifted-EDFA) shifted to a longer wavelength is a 1.58 μm band (L-band). Since each of the EDFA and the GS-EDFA described above has the gain wavelength bandwidth of 30 nm or more, it is also possible to use the two signal light wavelength bands together utilizing a multiplexer/demultiplexer corresponding to the C-band and the L-band, thereby realizing the bandwidth of 60 nm or more.

Further, an application of Raman amplification has been studied actively in recent years. When a silica-based fiber is used as an amplification medium, for example, a gain peak optical frequency of the Raman amplification becomes an optical frequency shifted to a lower frequency side by about 13.2 THz than a pumping light frequency supplied to the amplification medium. In other words, in terms of optical wavelengths, the Raman amplification has a gain band on a longer wavelength side than a pumping light wavelength and, for example, a Raman gain peak wavelength relative to the pumping light wavelength of 1.45 μm becomes near 1.55 μm shifted from the pumping light wavelength by about 100 nm.

In the following description, a difference between the pumping light frequency supplied to the amplification medium and the Raman gain peak frequency determined caused by the pumping light will be referred to as "Raman shift frequency".

In an optical amplifier utilizing the Raman amplification described above, in order to obtain an amplification effect for a requested signal light wavelength, it is important that the pumping light wavelength can be set in consideration of the Raman shift frequency. Further, it has been known that a gain wavelength characteristic of the Raman amplification can be flattened, using a plurality of pumping lights having different center wavelengths. For example, it has been reported that a bandwidth of about 100 nm can be ensured as the gain wavelength bandwidth of the Raman amplification by adjusting oscillation wavelengths and the output optical powers of a plurality of pumping light sources (refer to Y Emori, et al., "100 nm bandwidth flat gain Raman amplifiers pumped and gain-equalized by 12-wavelength-channel WDM high power laser diodes", OFC'99, PD19, 1999).

FIG. 24 is a diagram showing a configuration example of a conventional Raman amplifier.

In FIG. 24, the conventional Raman amplifier comprises: a multi-wavelengths pumping light source 101 generating a plurality of pumping lights $P_1$-$P_K$; and a multiplexer 102 supplying the pumping lights $P_1$-$P_K$ output from the multi-wavelengths pumping light source 101 to an optical fiber 100 serving as an amplification medium, wherein the pumping lights $P_1$-$P_K$ supplied from the multi-wavelengths pumping light source 101 to the optical fiber 100 via the multiplexer 102 are propagated in a direction opposite to that of signal lights $S_1$-$S_L$. In this conventional Raman amplifier, as shown in FIG. 25, for example, the wavelength allocation is applied, in which a signal light wavelength band wherein the plurality of signal lights $S_1$-$S_L$ are arranged at required intervals, is separated from a pumping light wavelength band wherein the plurality of pumping lights $P_1$-$P_K$ are arranged according to the signal light wavelength band. Further, there has also been known another configuration in which a gain equalizer 103 is used together with the above components, as shown in FIG. 26, in order to obtain a flat gain wavelength characteristic for the signal light wavelength band.

In order to realize a large-capacity and long-distance transmission system, it is important to extend (widen) the signal light wavelength bandwidth. In the case where the Raman amplification is utilized for realizing the wide bandwidth, it has been known that it is effective to apply the wavelength allocation, in which the signal light and pumping light are mixed in a certain wavelength band (refer to Japanese Unexamined Patent Publication No. 2002-229084, and Japanese Patent Application 2001-244798 and Japanese Patent Application 2001-390366, which are prior applications by the applicant of this invention).

FIG. 27 is a diagram showing a configuration example of the Raman amplifier to which the wavelength allocation described above is applied. Further, FIG. 28 is a diagram showing an exemplary wavelength allocation in the Raman amplifier of FIG. 27. In the case where some of the plurality of pumping lights $P_1$-$P_M$ are mixed in the signal light wavelength band as shown in FIG. 28, an optical circulator 104 is used as an optical device for multiplexing the pumping lights as shown in FIG. 27. Here, the pumping lights that are not mixed in the signal light wavelength band are indicated as $P_1$-$P_Q$ and the pumping lights that are mixed in the signal light wavelength band are indicated as $P_{Q+1}$-$P_M$.

Further, the Raman amplifier may be configured similarly to that shown in FIG. 26 as described above, wherein the gain equalizer 103 (a broken line portion in FIG. 27) is used together, in order to obtain the flat gain wavelength characteristic over the entire signal light band.

In the Raman amplifier to which is applied the wavelength allocation described above wherein the signal light and pumping light are mixed in the certain wavelength band, it has been known that the Raman amplification occurs largely between the plurality of pumping lights and, therefore, the power required for the pumping light on the shorter wavelength side becomes extremely large. As a result, there is a problem in that a multiplexing composition of the pumping light source becomes complicated. Moreover, an amplified spontaneous emission light noise generated by the pumping light on the shorter wavelength side is increased and, therefore, a noise characteristic of the shorter wavelength side signal light is deteriorated.

In order to solve this problem, for example, there has been proposed a technique for improving a noise characteristic of the Raman amplifier and, at the same time, for reducing the pumping light power on the shorter wavelength side, by modulating the power of each pumping light and reducing the time-wise overlap of the power of the pumping lights each having a frequency difference close to the Raman shift frequency, to reduce the efficiency of the Raman amplification occurring between these pumping lights (refer to Japanese Patent Application 2002-334037, which is a prior application by the applicant of this invention.) More specifically, for example, each pumping light power is modulated as shown in FIG. 29. The example in FIG. 29 shows a change in each pumping light power for the case where the pumping lights of 8 wavelengths, arranged at wavelength spacing corresponding to ⅓ of the Raman shift frequency $\Delta f_{RAMAN}$ (when a silica-based optical fiber is used as the amplification medium, $\Delta f_{RAMAN}$=13.2 THz, $\Delta f_{RAMAN}/3$=4.4 THz). Here, an optical pulse duty after the modulation is made to be 50%. The efficiency of the Raman amplification occurring between the pumping lights is increased to a maximal when the pumping lights are spaced from each other by the Raman shift frequency $\Delta f_{RAMM}$, namely in the example described above, when the pumping light $P_1$ and the pumping light $P_4$, the pumping light $P_2$ and the pumping light $P_5$, the pumping light $P_3$ and the pumping light $P_6$, the pumping light $P_4$ and the pumping light $P_7$, and the pumping light $P_5$ and the pumping light $P_8$ are combined with each other, respectively. Consequently, the power of each of the pumping lights is modulated so that the pumping lights are not overlapped in time-wise, to reduce the Raman amplification between each pumping light. Thus, it becomes possible to solve the problem described above.

However, the conventional Raman amplifier described above has problems as shown in (1)-(4) below:

(1) System Performance Degradation Due to an Increase of Loss at the Time of Gain Equalization While a profile of the Raman gain relative to wavelengths, which is obtained by using pumping lights of a plurality of wavelengths has a plurality of peaks according to the number of wavelengths of the pumping lights as shown in FIG. 30, for example, the respective peak wavelengths show different values from gain peak wavelengths that would be obtained when the pumping lights are used independently. More specifically, the example of FIG. 30 shows a relationship between the Raman gain and the wavelength for when the pumping lights of two wavelengths, 1433 nm and 1464 nm, are used. In the case where the pumping lights are used independently, as shown by narrow curves in the figure, the peak wavelengths of the Raman gain profile are 1529.6 nm and 1565.5 nm, respectively. In contrast, in the case where the pumping lights of the two wavelengths are used concurrently as shown by a thick curve in the figure, the gain profile has peaks at 1538.2 nm and 1563.9 nm. The gain peak corresponding to the pumping light of 1433 nm is shifted to the longer wavelength side by 8.6 nm and the gain peak corresponding to the pumping light of 1464 nm is shifted to the shorter wavelength side by 1.6 nm.

Therefore, in the Raman amplifier using pumping lights of a plurality of wavelengths, even if the wavelengths of the pumping lights are allocated at equal spacing, the Raman gain profile obtained actually does not have gain peaks at equal spacing. As a result, when performing the gain equalization by using together a gain equalizer as shown in FIG. 26 and the like, it is necessary to use a gain equalizer having a complicated loss profile. However, such a gain equalizer generally has a large loss and may be a factor leading to system performance degradation. Further, for example, although there is an optical device realizing the complicated loss profile by itself, such as a known slant type fiber Bragg grating in which a grating direction is slanted relative to an optical fiber axis, a wavelength range within which the gain equalization can be performed in such a device is generally limited to about 40 nm or less. As a result, in a system having a wider signal light wavelength band, such as more than 40 nm, every time of the gain equalization, a series of processing of performing the gain equalization after demultiplexing signal lights, and then multiplexing the signal lights again is needed and, therefore, excessive losses in a demultiplexer and a multiplexer may become a problem.

(2) Inefficiency due to Arrangement of Pumping Light at Unequal Spacing In order to avoid the problem described in (1) above to enable the use of a gain equalizer with a simple configuration, for example, it is considered to select the wavelengths of pumping lights so that the peak wavelengths of the Raman gain profile are allocated at equal spacing. More specifically, for example, as shown by a solid curve in FIG. 31, in order to obtain four gain peaks at intervals of 23 nm, it is necessary to use the pumping lights of four wavelengths, 1430 nm, 1448 nm, 1470 nm and 1502 nm, the wavelength spacing therebetween are not fixed. If such pumping lights, the wavelengths of which are allocated at unequal spacing, are used, it becomes possible to use a gain equalizer with a simple configuration, having a periodic loss wavelength characteristic as shown by a dotted curve in FIG. 31.

However, as described above with reference to FIG. 29, in order to perform the Raman amplification between each pumping light efficiently in the wavelength allocation in which the signal light and the pumping light are mixed in the certain wavelength band, it is effective to set intervals of the pumping light frequency to 1/integer number of those of the Raman shift frequency and, the allocation at unequal spacing of the wavelengths of the plurality of pumping lights will result in inefficiency in the Raman amplifier to which the wavelength setting as described above is applied.

Further, in Japanese Patent Application 2001-244798 and Japanese Patent Application 2001-390366 described above, the applicant of the invention has shown that the system performance can be improved by using an optical filter narrowing the pumping light spectrum mixed in the signal light band or an optical filter rejecting a Rayleigh scattered light of the pumping light. At this time, if the pumping lights are arranged at equal spacing, it becomes possible to apply optical filters having periodicity for the respective purposes, and it becomes no longer necessary to use multiple optical filters. Therefore, advantages in terms of loss and cost are obtained. On the other hand, if the pumping lights are arranged at unequal spacing, the advantages as described above will be lost.

(3) System Performance Degradation Due to an Increase of Gain Deviation in the Signal Light Band on the Shorter Wavelength Side The Raman amplifier having an amplification bandwidth equivalent to or higher than the Raman shift frequency as shown in FIGS. 27 to 29 above has a characteristic in that the gain deviation is increased on the shorter wavelength side. This characteristic will be described specifically with reference to FIGS. 32 and 33. FIG. 32 shows an example in which a plurality of signal lights is arranged on the shorter and longer wavelength sides of a pumping light of a single wavelength (1460.3 nm, for example) and FIG. 33 shows a wavelength characteristic of the Raman gain obtained in the wavelength allocation of the signal lights and the pumping light of FIG. 32. As shown in each figure, the pumping light of 1460.3 nm mixed in the signal light band gives a gain to the signal lights on the longer wavelength (lower frequency) side than the pumping light, while giving a loss to the signal lights on the shorter wavelength (higher frequency) side than the pumping light. Further, although not shown in the figure here, it is known that an effective cross-sectional area of an optical fiber used as an amplification medium is reduced on the shorter wavelength side. Therefore, the Raman effect (loss) occurring between the pumping light and the signal lights on the shorter wavelength side than the pumping light has the higher efficiency than that of the Raman effect (gain) occurring between the pumping light and the signal lights on the longer wavelength side than the pumping light. In the specific example of FIG. 33, since an absolute value of loss peak is about 20.0 dB whereas an absolute value of gain peak is about 14.1 dB, it is understood that the Raman effect on the shorter wavelength side has the higher efficiency than that on the longer wavelength side.

Next, based on the wavelength characteristic of the Raman effect obtained by the pumping light of single wave as described above, the consideration is made on the gain wavelength characteristic of the Raman amplifier using pumping lights of a plurality of wavelengths. FIG. 34 shows an example of the gain wavelength characteristic calculated for the Raman amplifier having the amplification bandwidth about four times the Raman shift frequency. Note, the gain wavelength characteristic of FIG. 34 is a calculation result for the case where, in the Raman amplifier having the amplification bandwidth of 56.5 THz about four times the Raman shift frequency which is set to 13.2 THz, in other words, the amplification bandwidth of 405 nm corresponding to the range of from 1277.3 nm to 1682.3 nm, the pumping lights $P_1$-$P_{13}$ of thirteen wavelengths are arranged at equal frequency intervals of 4.4 THz (one third of the Raman shift frequency) (refer to Table 1 below), and also the Raman amplification between each pumping light is suppressed by modulating each pumping light as shown in FIG. 29 above.

TABLE 1

| Pumping Light | Optical Frequency (THz) | Optical Wavelength (nm) |
|---|---|---|
| $P_1$ | 244.9 | 1224.1 |
| $P_2$ | 240.5 | 1246.5 |
| $P_3$ | 236.1 | 1269.8 |
| $P_4$ | 231.7 | 1293.9 |
| $P_5$ | 227.3 | 1318.9 |
| $P_6$ | 222.9 | 1345.0 |
| $P_7$ | 218.5 | 1372.0 |
| $P_8$ | 214.1 | 1400.2 |
| $P_9$ | 209.7 | 1429.6 |
| $P_{10}$ | 205.3 | 1460.3 |
| $P_{11}$ | 200.9 | 1492.2 |
| $P_{12}$ | 196.5 | 1525.7 |
| $P_{13}$ | 192.1 | 1560.6 |

The Raman gain profile shown by a thick curve in FIG. 34 that is obtained when the pumping lights of thirteen wavelengths are used, is obtained approximately based on the overlap of each of the Raman gains that are obtained when the pumping lights $P_1$-$P_{13}$ shown by narrow curves in FIG. 34 are used independently. Further, here, the power of each pumping light is adjusted so that a minimal value of the gain by the total pumping lights becomes about 10 dB. In this calculation result, an average value of the gain by the total pumping lights is about 12.0 dB and the gain deviation is about 8.7 dB.

As shown in FIG. 34, since the pumping light contributory to the amplification near the gain peak of the longest wavelength only the pumping light $P_{13}$ of the longest wavelength, a burden on the pumping light $P_{13}$ at this gain peak is larger than at other gain peaks contributed by the plurality of pumping lights. Therefore, in order to obtain a flat gain, it is necessary to obtain a relatively large gain due to the Raman effect by the pumping light $P_{13}$ of the longest wavelength. In this case, as apparent from the relationship shown in FIG. 33 above, the loss peak occurring on the shorter wavelength side than the pumping light $P_{13}$ also becomes relatively large.

In order to compensate for this loss peak by the pumping light $P_{13}$, the Raman effect by the pumping light $P_7$ on the higher frequency (shorter wavelength) side than the pumping light $P_{13}$ of the longest wavelength by 26.4 THz in terms of frequency needs to have a large gain. Similarly, the Raman effect by the pumping light $P_1$ on the higher frequency side than the pumping light $P_7$ by 26.4 THz in terms of frequency needs to have a further large gain. Therefore, the gain deviation on the shorter wavelength side will be especially increased. The data shown in Table 2 below summarizes maximal values and minimal values of the Raman gains corresponding to the pumping lights $P_1$-$P_{13}$ of respective wavelengths, and FIG. 35 is a plot of the data of Table 2, wherein the horizontal axis represents the wavelength and the vertical axis represents the gain.

TABLE 2

| Pumping Light | Maximal Wavelength (nm) | Maximal Frequency (THz) | Maximal Value (dB) | Minimal Wavelength (nm) | Minimal Frequency (THz) | Minimal Value (dB) |
|---|---|---|---|---|---|---|
| $P_1$ | 1301.2 | 230.4 | 18.2 | 1310.3 | 228.8 | 9.9 |
| $P_2$ | 1322.4 | 226.7 | 18.2 | 1336.0 | 224.4 | 10.1 |
| $P_3$ | 1348.6 | 222.3 | 15.3 | 1362.7 | 220.0 | 10.1 |
| $P_4$ | 1378.4 | 217.5 | 14.2 | 1392.4 | 215.3 | 10.0 |
| $P_5$ | 1408.1 | 212.9 | 13.4 | 1422.2 | 210.8 | 10.1 |
| $P_6$ | 1438.5 | 208.4 | 14.4 | 1450.4 | 206.7 | 9.9 |
| $P_7$ | 1466.0 | 204.5 | 13.7 | 1479.7 | 202.6 | 9.9 |
| $P_8$ | 1495.2 | 200.5 | 14.1 | 1513.3 | 198.1 | 10.1 |
| $P_9$ | 1528.8 | 196.1 | 11.7 | 1547.7 | 193.7 | 10.1 |
| $P_{10}$ | 1565.5 | 191.5 | 11.6 | 1584.5 | 189.2 | 10.2 |
| $P_{11}$ | 1601.5 | 187.2 | 11.0 | 1620.5 | 185.0 | 10.1 |
| $P_{12}$ | 1640.9 | 182.7 | 11.3 | 1659.1 | 180.7 | 10.1 |
| $P_{13}$ | 1672.9 | 179.2 | 10.6 | | | |

As apparent from Table 2 and FIG. 35, since the gain deviation on the shorter wavelength side is increased with the extension of the wavelength band of the signal light, the configuration of the requested gain equalizer becomes complicated and thus the loss is increased, and may be a factor leading to system performance degradation.

Next, a transmission loss wavelength characteristic of a typical single-mode optical fiber is shown in FIG. 38. A wavelength band of about 1.5 µm to 1.6 µm is a low loss wavelength band called C-band (1.530 µm to 1.565 µm) and L-band (1.565 µm to 1.625 µm). In a wavelength longer than about 1.6 µm, a transmission loss is abruptly increased due in large part to an infrared absorption loss, while in a wavelength shorter than about 1.5 µm, the transmission loss is increased due in large part to a Rayleigh scattering loss. Further, a wavelength in the vicinity of about 1.4 µm is a wavelength of OH-absorption loss caused by residual OH group possessed by the optical fiber, and therefore, the transmission loss becomes larger. Heretofore, there has been promoted the reduction of OH-absorption loss. For an optical fiber having a positive dispersion characteristic (positive dispersion fiber), there has been developed an optical fiber in which the OH-absorption loss is completely extinct in substantial. On the other hand, for an optical fiber having a negative dispersion characteristic (negative dispersion fiber), since a concentration of dopant, such as Ge is high, it is difficult to significantly reduce the OH-absorption loss. However, in view of the Raman amplification, it is advantageous to apply the negative dispersion fiber. This is because the negative dispersion fiber has a nonlinear effective core area smaller than that of the positive dispersion fiber, so that the Raman amplification can be effectively achieved. Accordingly, in a Raman amplifier to which the negative dispersion fiber is applied, there exists the OH-absorption loss possessed by the optical fiber, and therefore, there is caused a problem in that, if a pumping light wavelength is allocated in the vicinity of the absorption peak wavelength, the required pumping light power for obtaining a required gain becomes significantly larger.

Further, in the case where a pumping light wavelength, which is shorter by even number times a Raman shift frequency than the longest pumping light wavelength, is coincident with a wavelength of about 1.4 µm (about 214 THz), which is the wavelength of OH-absorption loss possessed by the optical fiber, the significantly large pumping light power is needed due to the transmission loss caused by a Raman effect (loss) and the OH-absorption loss.

As described above, in the Raman amplifier having a signal light wavelength bandwidth exceeding the Raman shift frequency, since a required gain of a specific pumping light wavelength becomes significantly larger due to the transmission loss caused by the Raman effect (loss) and the OH-absorption loss possessed by the optical fiber, there is caused a problem in that an optical noise characteristic is deteriorated due to an increase of pumping light power or a problem in that a gain deviation is increased with the extension of signal wavelength bandwidth, resulting in the deterioration of optical transmission system performance.

(4) System Performance Degradation Due to Complicated Shape of Gain Wavelength Characteristics As can be guessed from the calculation result shown in FIG. 34 above, as the amplification bandwidth of the Raman amplifier is increased, the gain wavelength characteristic also become more complicated. For example, as shown in FIG. 36, in which an amplification band portion in the gain wavelength characteristic shown in FIG. 34 is enlarged, the gain wavelength characteristic in this portion has a complicated shape, which can be divided into a plurality of wavelength bands $B_1$, $B_2$ and $B_3$ having respective gain deviations of substantially even magnitudes. Even if an optical filter having a periodic loss characteristic, which is typically used, is applied to the Raman amplifier having the gain wavelength characteristic of such a complicated shape, it is difficult to perform the efficient gain equalization.

FIG. 37 is a diagram showing an example in which the gain equalization is performed on the gain wavelength characteristic of FIG. 36 by applying the optical filter having a periodic loss characteristic. In this figure, a narrow curve represents a characteristic before the gain equalization, a thick curve represents a loss wavelength characteristic of the gain equalizer, and an extra thick curve represents a characteristic after the gain equalization. Here, two types of periodic optical filters are used to perform the gain equalization so that the gain deviation for the wavelength band $B_1$ where the large gain deviation occurs in FIG. 36 can be reduced while ensuring a required gain. More specifically, two types of optical filters, one having a loss wavelength characteristic of a period of 3.76 THz, an amplitude of 3.0 dB and a center frequency of 230.4 THz and the other having a loss wavelength characteristic of a period of 4.41 THz, an amplitude of 1.2 dB and a center frequency of 231.1 THz, are used in combination as the gain equalizer. From the characteristic after the gain equalization represented by the extra thick curve in the figure, it can be understood that the gain deviation can be reduced and the gain around 10 dB can be secured for the wavelength band $B_1$ on the shorter wavelength band, but the gain deviation is increased and the gain value is reduced significantly for each of other wavelength bands $B_2$ and $B_3$.

Therefore, in order to flatten the wavelength deviation of the Raman gain as shown in FIG. 36, it is required to apply a gain equalizer having the larger loss deviation and a more complicated loss wavelength characteristic. Such a gain equalizer has a large loss and therefore, may be a factor leading to system performance degradation. Further, even if the known optical device capable of realizing the complicated loss wavelength characteristic such as the slanted fiber Bragg grating, similarly in the problem described in (1) above, the wavelength range within which the gain equalization can be performed is limited. As a result, as the signal light bandwidth is increased, excessive losses are increased in the demultiplexer and the multiplexer, resulting in system performance degradation.

SUMMARY OF THE INVENTION

The present invention has been accomplished in view of the problems described above in (1)-(4) and has an object to provide a Raman amplifier capable of easily reducing the wavelength deviation of a Raman gain, while suppressing system performance degradation, and an optical transmission system using such a Raman amplifier.

In order to achieve the above object, according to a first aspect of the present invention, there is provided a Raman amplifier for supplying pumping lights to an amplification medium through which is propagated a wavelength division multiplexed signal light obtained by multiplexing a plurality of signal lights of different wavelengths, to amplify the wavelength division multiplexed signal light due to a Raman effect, comprising: a first pumping light generating section that generates a plurality of pumping lights arranged at equal wavelength spacing in a signal light wavelength band where the plurality of signal lights are arranged, which is shifted to a shorter wavelength side in accordance with the wavelength width corresponding to a Raman shift frequency; a second pumping light generating section that generates pumping lights of one or more wavelengths arranged in a wavelength band on at least one, of a shorter wavelength side and a longer wavelength side than a wavelength band of the pumping lights generated by the first pumping light generating section, the wavelength and power of which are set so that peak wavelength spacing of a Raman gain in the signal light wavelength band are substantially equal to each other; and a multiplexing section that multiplexes the pumping lights generated respectively by the first and second pumping light generating sections to supply the multiplexed pumping light to the amplification medium.

In the Raman amplifier of such a configuration, the first pumping lights arranged at equal wavelength spacing and the second pumping lights arranged on the shorter or longer wavelength side of the first pumping lights are supplied to the amplification medium at the same time, and the Raman amplification of the wavelength division multiplexed signal light is performed in accordance with a gain wavelength characteristic in which gain peak wavelengths are allocated at substantially equal spacing in the signal light wavelength band. As a result, it becomes possible to reduce the wavelength deviation of the power of the Raman amplified wavelength division multiplexed signal light and to improve the system performance, for example, by utilizing a gain equalizer with a simple configuration and low loss, that has the periodicity corresponding to the peak wavelength spacing of the Raman gain.

Further, according to a second aspect of the present invention, there is provided a Raman amplifier for supplying pumping lights to an amplification medium through which is propagated a wavelength division multiplexed signal light obtained by multiplexing a plurality of signal lights of different wavelengths arranged in a wavelength band corresponding to about two times or more a Raman shift frequency, to amplify the wavelength division multiplexed signal light due to a Raman effect, comprising: a pumping light source generating a plurality of pumping lights arranged in a signal light wavelength band where the plurality of signal lights are arranged, which is shifted to a shorter wavelength side in accordance with a wavelength width corresponding to the Raman shift frequency; a pumping light power control section that controls the power of the pumping lights generated by the pumping light source so that either minimal values or maximal values of a wavelength characteristic of a Raman gain in the signal light wavelength band are substantially the same; an optical circulator supplying the pumping lights generated by the pumping light source to the amplification medium; a demultiplexer demultiplexing the wavelength division multiplexed signal light that has been propagated through the amplification medium and has been Raman amplified, into a plurality of wavelength bands previously set according to the wavelength deviation of the Raman gain; a plurality of gain equalizers reducing the wavelength deviation of the power of the wavelength division multiplexed signal light demultiplexed by the demuitiplexer, for each of the wavelength bands; and a multiplexer multiplexing the signal light output from each of the gain equalizers.

In the Raman amplifier of such a configuration, the wavelength division multiplexed signal light is Raman amplified in a condition that the power of the plurality of pumping lights is controlled so that either the minimal values or the maximal values of the Raman gain in the signal light wavelength band are substantially the same, and the wavelength division multiplexed signal light after Raman amplified is demultiplexed for each of the plurality of wavelength bands set according to the wavelength deviation of the Raman gain and, then, the gain equalization is performed for each of the plurality of wavelength bands. At this time, since it becomes possible to use gain equalizers with a simple configuration and low loss as the ones corresponding to each of the wavelength bands, the degradation of system performance due to the gain equalization can be suppressed.

Still further, according to a third aspect of the present invention, there is provided a Raman amplifier for supplying pumping lights to an amplification medium through which is propagated a wavelength division multiplexed signal light obtained by multiplexing a plurality of signal lights of different wavelengths arranged in a wavelength band corresponding to a Raman shift frequency or more, to amplify the wavelength division multiplexed signal light due to a Raman effect, comprising: a pumping light source generating a plurality of pumping lights arranged in a signal light wavelength band where the plurality of signal lights are arranged, which is shifted to a shorter wavelength side in accordance with the wavelength width corresponding to a Raman shift frequency; a pumping light power control section that controls the power of the pumping lights generated by the pumping light source so that minimal points and maximal points of a wavelength characteristic of a Raman gain in the signal light wavelength band are placed substantially in uniformity, in a positive region and a negative region with a previously set reference gain value as a boundary; an optical circulator supplying the pumping lights generated by the pumping light source to the amplification medium; and a gain equalizer reducing the wavelength deviation of the power of the wavelength division multiplexed signal light over the entire signal light wavelength band.

In the Raman amplifier of such a configuration, the wavelength division multiplexed signal light is Raman amplified in a condition that the power of the plurality of pumping lights is controlled so that the maximal points and the minimal points of the wavelength characteristic of the Raman gain in the signal light wavelength band are placed substantially in uniformity in the positive and negative regions with the reference gain value as the boundary, and the wavelength deviation of the power of the Raman amplified wavelength division multiplexed signal light over the entire wavelength band is reduced collectively by the gain equalizer with a simple configuration and low loss. Thus, it becomes possible to suppress the degradation of system performance due to the gain equalization.

Furthermore, according to a fourth aspect of the present invention, there is provided a Raman amplifier for supplying pumping lights to an amplification medium through which is propagated a wavelength division multiplexed signal light obtained by multiplexing a plurality of signal lights of different wavelengths arranged in a wavelength band corresponding to approximately two times a Raman shift frequency or more, to amplify the wavelength division multiplexed signal light due to a Raman effect, comprising: a pumping light source generating a plurality of pumping lights arranged in a signal light wavelength band where said plurality of signal lights are arranged, which is shifted to a shorter wavelength side in accordance with the wavelength width corresponding to the Raman shift frequency; and an optical circulator supplying the pumping lights generated by the pumping light source to the amplification medium, wherein a pumping light wavelength, which is shorter by even number times the wavelength width corresponding to the Raman shift frequency than the longest pumping light wavelength among said plurality of pumping light wavelengths, is not coincident with a wavelength of about 1.4 μm (about 214 THz in frequency), which is a wavelength of OH-absorption loss possessed by an optical fiber.

In the Raman amplifier having such a configuration, the pumping light wavelength being shorter by even number times the wavelength width corresponding to the Raman shift frequency than the longest pumping light wavelength, is not coincident with the wavelength of about 1.4 μm (about 214 THz), which is the wavelength of OH-absorption loss possessed by the optical fiber, for example, the pumping light wavelength is allocated in a wavelength range apart from the wavelength of OH-absorption loss by ⅓ to ⅔ times the wavelength width corresponding to the Raman shift frequency with full width at half maximum of a Raman gain peak, so that a required gain of a specific pumping light wavelength becomes significantly larger, to thereby enable the optical noise characteristic deterioration due to the large required pumping light power to be suppressed.

Furthermore, according to a fifth aspect of the present invention, there is provided a Raman amplifier for supplying pumping lights to an amplification medium through which is propagated a wavelength division multiplexed signal light obtained by multiplexing a plurality of signal lights of different wavelengths arranged in a wavelength band corresponding to approximately two times a Raman shift frequency or more, to amplify the wavelength division multiplexed signal light due to a Raman effect, comprising: a pumping light source generating a plurality of pumping lights arranged in a signal light wavelength band where said plurality of signal lights are arranged, which is shifted to a shorter wavelength side in accordance with the wavelength width corresponding to the Raman shift frequency; and an optical circulator supplying the pumping lights generated by said pumping light source to said amplification medium, wherein a pumping light wavelength is not allocated in the vicinity of a wavelength, which is shorter by even number times the wavelength width corresponding to the Raman shift frequency than the longest pumping light wavelength among the plurality of pumping light wavelengths, to have an invalid signal wavelength band exist in the vicinity of a wavelength, which is shorter by odd number times the wavelength width corresponding to the Raman shift frequency than the longest pumping light wavelength.

In the Raman amplifier having such a configuration, the pumping light wavelength is not allocated in the vicinity of the wavelength, which is shorter by even number times the wavelength width corresponding to the Raman shift frequency than the longest pumping light wavelength, to have the invalid signal wavelength band exist in the vicinity of the wavelength, which is shorter by odd number times the wavelength width corresponding to the Raman shift frequency than the longest pumping light wavelength, so that a required gain of a specific pumping light wavelength becomes significantly larger, to thereby enable the optical noise characteristic deterioration due to the large required pumping light power or the deterioration of optical transmission system performance due to a large gain deviation caused by a significant increase of the required gain of the specific pumping light wavelength, to be suppressed.

Even further, by using any one of the first to third aspects together with the fifth aspect, it becomes possible to suppress the deterioration of system performance due to the further reduction of gain deviation and the complicated shape of gain wavelength characteristic.

The other objects, features and advantages of the present invention will be apparent from the following description of the embodiments with reference to the accompanying drawings.

BRIEF DESCRIPTION OF THE DRAWINGS

FIG. 3 is a block diagram showing a specific configuration example of a multi-wavelengths pumping light source in the first embodiment;

FIG. 4 is a diagram showing an example of a wavelength transmission characteristic of a gain equalizer in the first embodiment;

DETAILED DESCRIPTION OF THE INVENTION

Figure 1:
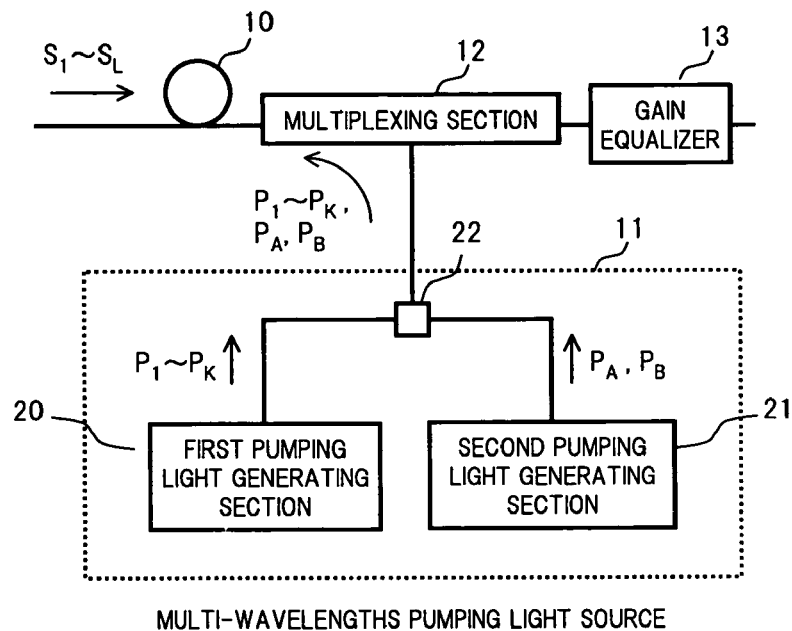
FIG. 1 is a block diagram showing a configuration of a Raman amplifier according to a first embodiment of the present invention.

Hereinafter, embodiments of the present invention will be described with reference to drawings. In this description, same reference numerals denote same or corresponding parts throughout all figures.

Figure 2:
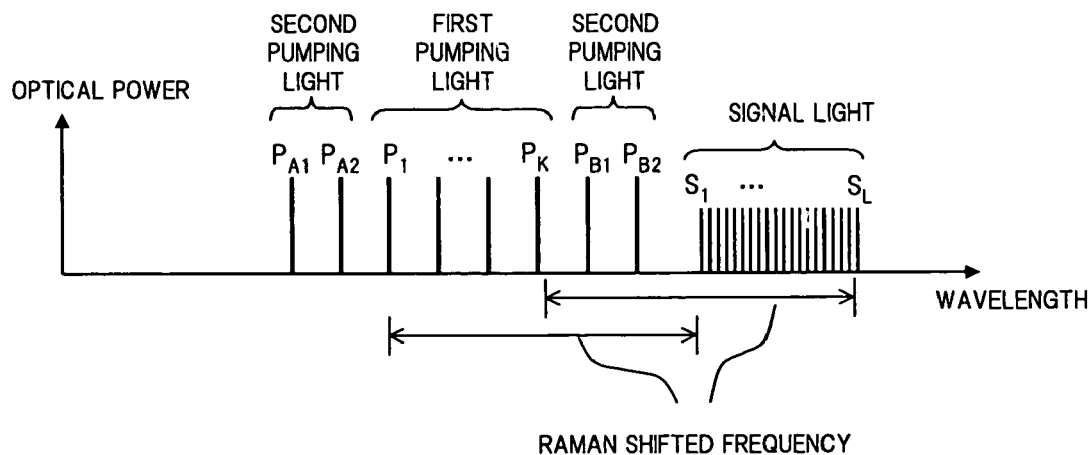
FIG. 2 is a diagram showing the wavelength allocation of signal lights and pumping lights in the first embodiment.

FIG. 1 is a block diagram showing a configuration of a Raman amplifier according to a first embodiment of the present invention. Further, FIG. 2 is a diagram showing the wavelength allocation of signal lights and pumping lights in the Raman amplifier of FIG. 1.

In FIG. 1, the Raman amplifier of the first embodiment comprises, for example, a multi-wavelengths pumping light source 11 generating pumping lights for Raman amplifying a WDM signal light being propagated through an optical fiber 10 serving as an amplification medium, a multiplexing section 12 that supplies the pumping lights generated by the multi-wavelengths pumping light source 11 to the optical fiber 10, and a gain equalizer 13 reducing the inter-wavelength optical power deviation occurring in the WDM signal light according to a gain wavelength characteristic of Raman amplification.

The optical fiber 10 can, for example, act as an optical transmission path connecting between terminal stations or repeater stations of an optical transmission system to which the present Raman amplifier is applied. Alternatively, a Raman amplification optical fiber provided separately from the optical transmission path, in which a nonlinear effect is likely to occur, may be adopted as the optical fiber 10. In the former case, the Raman amplifier will be a distributed type and, in the latter case, it will be a concentrated type. The WDM signal light being propagated through the optical fiber 10 in one direction (in the right direction in FIG. 1) contains a plurality of signal lights $S_1$-$S_L$ of different wavelengths.

The multi-wavelengths pumping light source 11 includes, for example, a first pumping light generating section 20, a second pumping light generating section 21 and a multiplexer 22. The first pumping light generating section 20 outputs a plurality of pumping lights $P_1$-$P_K$ of different wavelengths at required power. The wavelengths of the pumping lights $P_1$-$P_K$ are set according to the wavelengths of the signal lights $S_1$-$S_L$ being propagated through the optical fiber 10 and, more specifically, as shown in FIG. 2, the pumping lights $P_1$-$P_K$ are arranged at equal wavelength spacing within a wavelength band of the signal lights $S_1$-$S_L$, shifted to a shorter wavelength side by about the wavelength width corresponding to a Raman shift frequency. Note, in the following description, the pumping lights $P_1$-$P_K$ will be referred collectively to as first pumping lights.

The second pumping light generating section 21 outputs a pumping light $P_A$, the wavelength of which is allocated on a shorter wavelength side than a wavelength band of the first pumping lights, and a pumping light PB, the wavelength of which is allocated on a longer wavelength side than the wavelength band of the first pumping lights, at required power, respectively. More specifically, as shown in FIG. 2, for the pumping light $P_A$ on the shorter wavelength side, the pumping lights $P_{A1}$, and $P_{A2}$ of two waves are arranged at required spacing in a band on a shorter wavelength side than the pumping light $P_1$ of the shortest wavelength among the first pumping lights. On the other hand, for the pumping light $P_B$ on the longer wavelength side, the pumping lights $P_{B1}$ and $P_{B2}$ of two waves are arranged at required spacing in a band on a longer wavelength side than the pumping light $P_K$ of the longest wavelength among the first pumping lights. Note, in the following description, the pumping light $P_{A1}$, $P_{A2}$, $P_{B1}$ and $P_{B2}$ will be referred collectively to as second pumping lights. Although a plurality of pumping lights is disposed in both bands on the shorter and longer wavelength sides than the wavelength band of the first pumping lights, respectively, the present invention is not limited thereto, and it is possible to arrange at least one pumping light in the band on either the shorter wavelength side or the longer wavelength side, to be set as the second pumping light.

The multiplexer 22 multiplexes the first and second pumping lights output from the pumping light generating sections 20 and 21, to send the multiplexed light to the multiplexing section 12.

The multi-wavelengths pumping light source 11 described above can be realized, for example, by a specific configuration as shown in FIG. 3. In the configuration example of FIG. 3, pumping light sources corresponding respectively to the pumping lights $P_1$-$P_K$, $P_{A1}$, $P_{A2}$, $P_{B1}$ and $P_{B2}$ of respective wavelengths, are provided and output lights from the pumping light source are sent to respective input ports of the multiplexer 22 to be multiplexed. Then, in this configuration, the multiplexed pumping light is divided so as to correspond to a plurality of systems (four systems SYS1-SYS4 in the figure), and one of the branched lights is given to the multiplexing section 12.

The multiplexing section 12 gives the first and second pumping lights from the multi-wavelengths pumping light source 11 to one end on a signal light output side of the optical fiber 10, and also transmits the WDM signal light that has been propagated through the optical fiber 10 to be Raman amplified, to the gain equalizer 13 at a latter stage. Here, the first and second pumping lights given to the optical fiber 10 by the multiplexing section 12 is propagated through the optical fiber 10 in a direction opposite to the propagation direction of the WDM signal light. In the case where the wavelength allocation in which the signal light wavelength band is separated from the pumping light wavelength band is applied as shown in FIG. 2, for example, a WDM coupler may be used as the multiplexing section 12. Alternatively, although not shown here, in the case where the wavelength allocation in which the pumping lights are mixed into a part of the signal light wavelength band, for example, an optical circulator may be used as the multiplexing section 12.

The gain equalizer 13 receives via the multiplexing section 12 the WDM signal light that is Raman amplified by having been propagated through the optical fiber 10 supplied with the first and second pumping lights from the multi-wavelengths pumping light source 11. The gain equalizer 13 has a wavelength transmission (loss) characteristic corresponding to a gain wavelength characteristic of Raman amplification, and reduces the inter-wavelength optical power deviation occurred in the above WDM signal light to generate a flat WDM signal light. In a specific configuration of the gain equalizer 13, for example, a typical periodic optical filter having a periodic wavelength transmission characteristic as shown in FIG. 4 such as a Mach-Zehnder optical filter can be used because peaks in the gain wavelength characteristic of the Raman amplification are placed at equal wavelength spacing as described below.

Next, an effect of the Raman amplifier of the first embodiment will be described.

In the Raman amplifier of this embodiment, in addition to the first pumping lights $P_1$-$P_K$ corresponding to the wavelength band of the signal lights $S_1$-$S_L$, similar to those in the conventional Raman amplifier, the second pumping lights $P_A$ and $P_B$ arranged in the band on the shorter and longer wavelength sides than the wavelength band of the first pumping lights are also given to the optical fiber 10 acting as the amplification medium, so that gain peak wavelengths of the Raman amplification in the optical fiber 10 are allocated at equal wavelength spacing in the signal light wavelength band.

Figure 5:
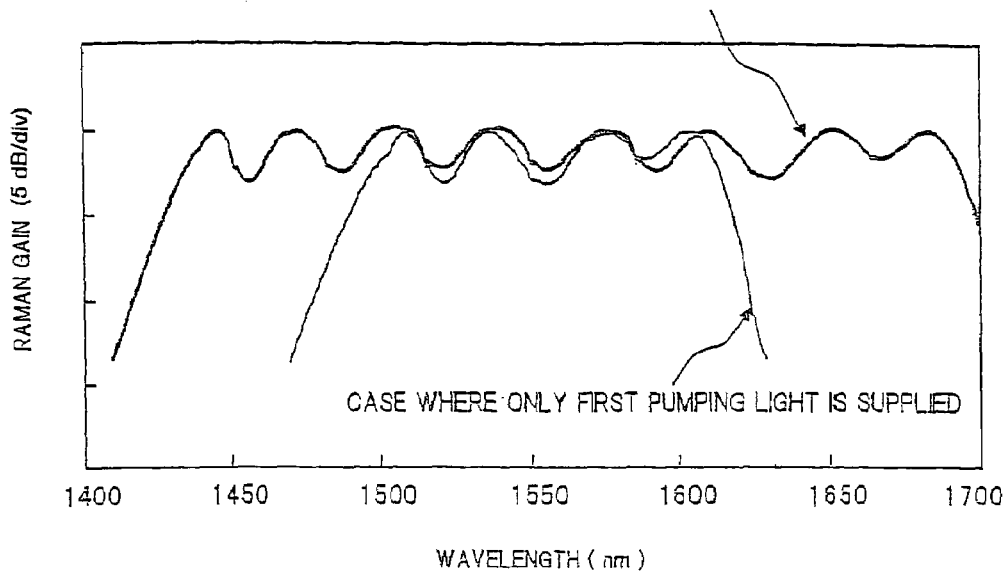
FIG. 5 is a diagram showing a specific example of a gain wavelength characteristic realized in the first embodiment.

FIG. 5 is a diagram showing a specific example of gain wavelength characteristic realized by this Raman amplifier. Here, in order to make clear the effect by adding the second pumping lights, the gain wavelength characteristic for when only the first pumping lights are supplied to the optical fiber 10 (a narrow curve) and the gain wavelength characteristic for when both the first and second pumping lights are supplied to the optical fiber 10 (a thick curve) are shown in an overlapped manner. Further, the data shown in Table 3 below summarizes gain peak wavelengths and frequency intervals between adjacent gain peaks in each of the characteristics shown in FIG. 5.

TABLE 3

| Only first pumping lights are supplied | | First and second pumping lights are supplied | |
|---|---|---|---|
| Peak Wavelength (nm) | Frequency Intervals (THz) | Peak Wavelength (nm) | Frequency Intervals (THz) |
| — | — | 1445 | — |
| — | — | 1472 | 3.9 |
| 1510 | — | 1505 | 4.4 |
| 1537 | 3.5 | 1539 | 4.4 |
| 1575 | 4.7 | 1575 | 4.4 |
| 1603 | 3.4 | 1609 | 4.1 |
| — | — | 1651 | 4.7 |
| — | — | 1682 | 3.4 |

Figure 29:
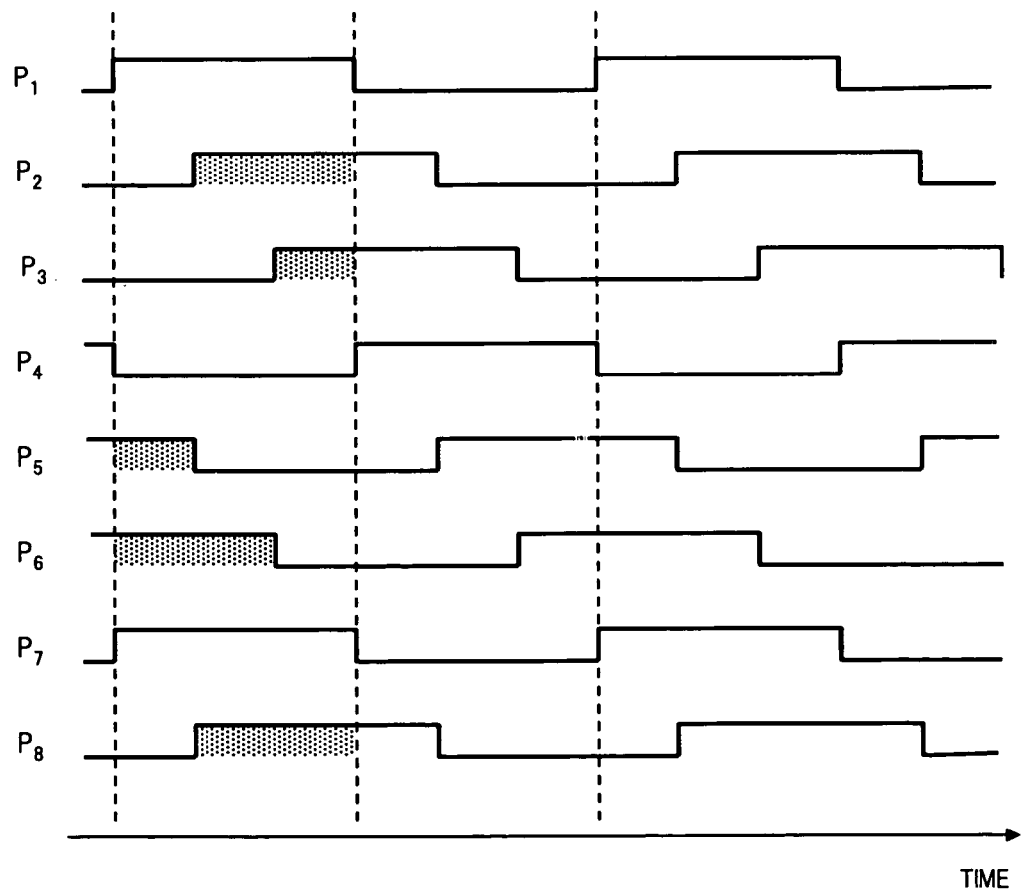
FIG. 29 is a diagram for explaining a pumping light modulation system for reducing the efficiency of Raman amplification occurring between each pumping light.
Figure 30:
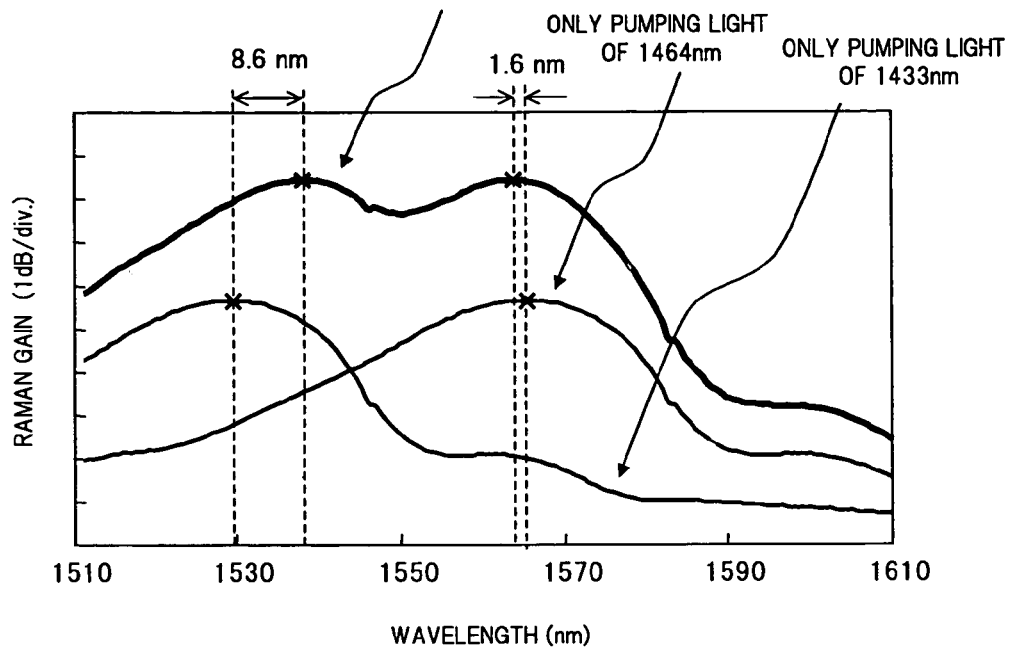
FIG. 30 is a diagram for explaining a wavelength characteristic of a Raman gain obtained by using a plurality of pumping lights.
Figure 31:
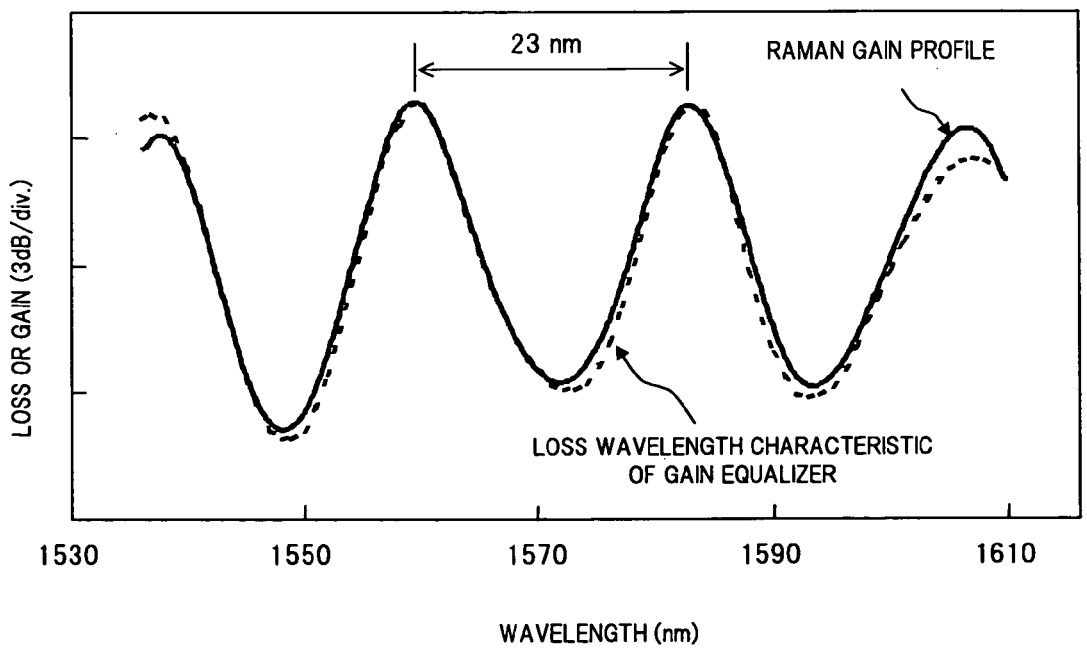
FIG. 31 is a diagram showing a Raman gain profile obtained for when the pumping lights arranged at unequal spacing are used and a loss wavelength characteristic of a gain equalizer corresponding to the Raman gain profile.
Figure 32:
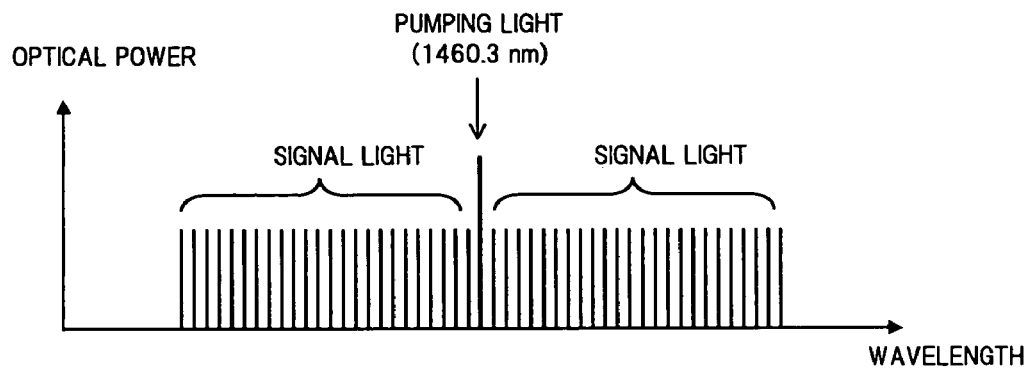
FIG. 32 is a diagram showing an example in which a pumping light of a single wavelength is arranged in a signal light wavelength band.
Figure 33:
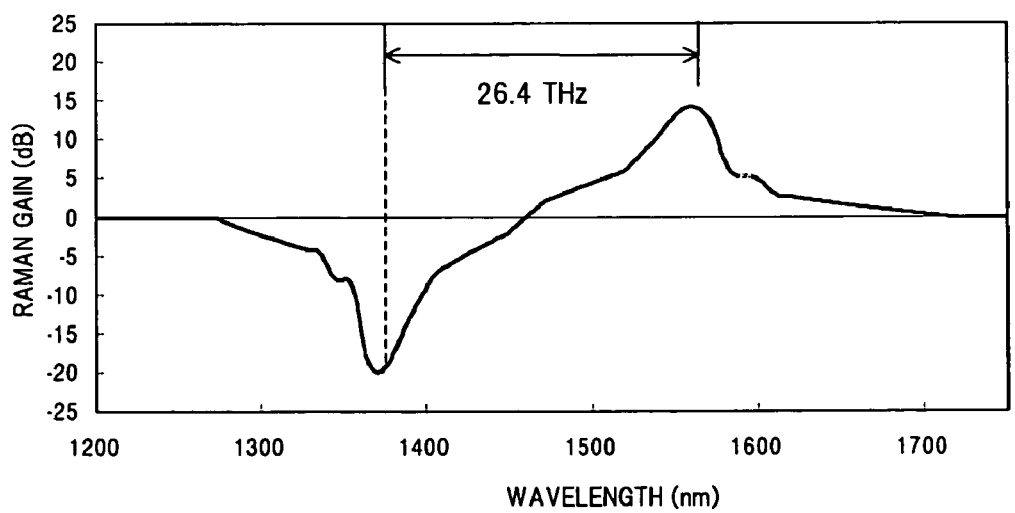
FIG. 33 is a diagram showing a wavelength characteristic of a Raman gain obtained in the wavelength allocation of FIG. 32.
Figure 34:
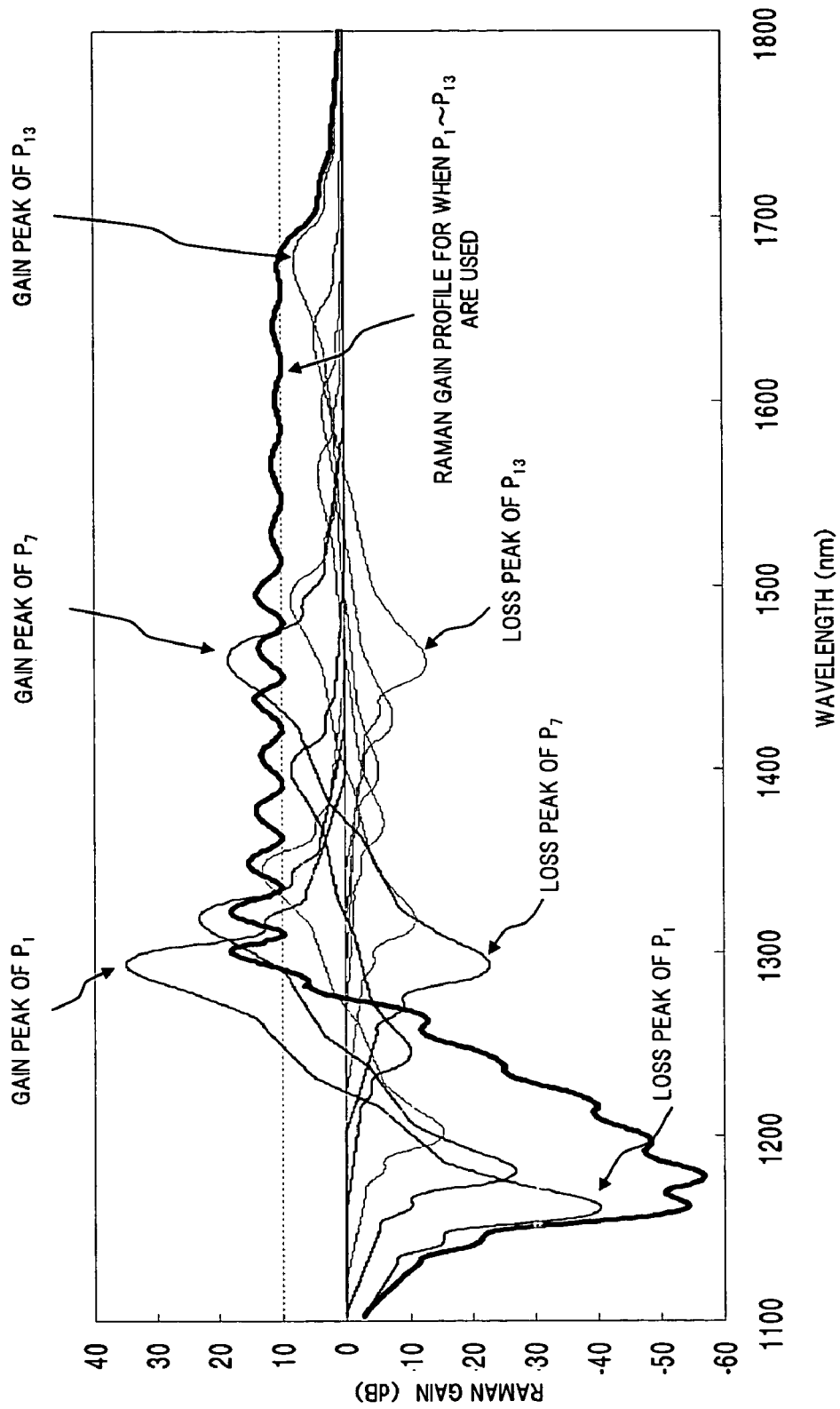
FIG. 34 is a diagram showing an example of a gain wavelength characteristic calculated for a Raman amplifier having an amplification bandwidth about four times a Raman shift frequency.
Figure 35:
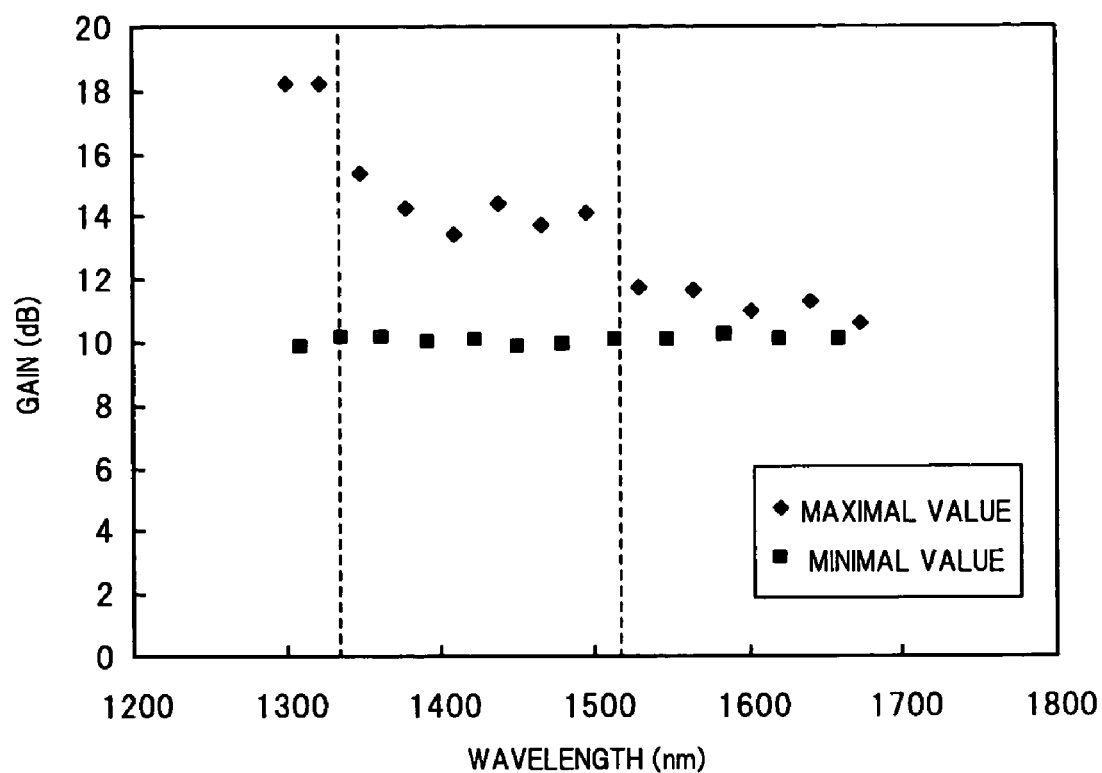
FIG. 35 is a diagram showing the distribution of maximal and minimal values of a Raman gain in FIG. 34.
Figure 36:
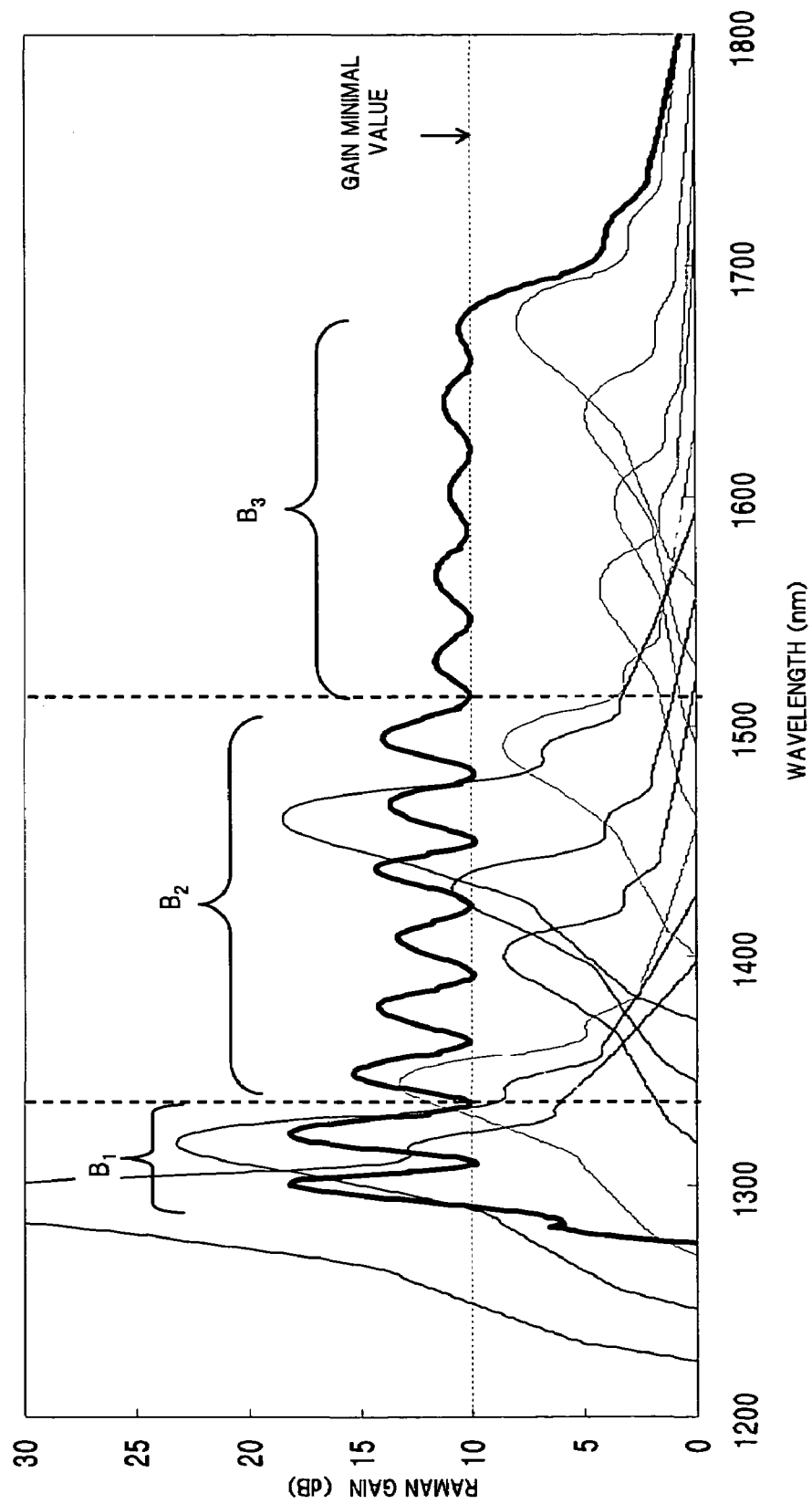
FIG. 36 is a diagram in which an amplification band portion of the gain wavelength characteristic of FIG. 34 is enlarged.

In specific example of the gain wavelength characteristics shown in FIG. 5, and Table 3, the pumping lights $P_1$-$P_4$ of four wavelengths of 1409.0 nm, 1438.8 nm, 1469.8 nm and 1502.2 nm are set as the first pumping lights. Further, the pumping lights $P_{A1}$, and $P_{A2}$ of two wavelengths of 1353.0 nm and 1380.5 nm are set as second pumping lights arranged on the shorter wavelength side than the wavelenght band of the first pumping lights, and the pumping lights $P_{B1}$ and $PB_2$ of two wavelengths of 1536.1 nm and 1571.5 nm are set as the second pumping lights arranged on the longer wavelength side. Still further, for both of the first and second pumping lights, the wavelength spacing between each pumping light is set to be equal at 4.4 THz in terms of frequency. In addition, the processing is taken in which the modulation of the pumping light power as shown in FIG. 29 described above the preformed to reduce the efficiency of the Raman amplification occurring between each pumping light. Note, an optical circulator is used as the multiplexing section 12, since the second pumping lights on the longer wavelength side are mixed into part of the signal light wavelength band.

In the wavelength allocation of the pumping lights as described above, it is understood that the gain wavelength characteristic for when only the first pumping lights are supplied to the optical fiber 10, is such that only the interval (4.7 THz) between a second gain peak and a third gain peak from the shorter wavelength side approximates the interval (4.4 THz) between each pumping light, but the intervals (3.5 THz and 3.4 THz) on the outside of the interval mentioned above are narrower than the interval between each pumping light, which shows that the gain peaks are placed at unequal intervals. Contrary to this, it is understood that the gain wavelength characteristic for when the first and second pumping lights are supplied to the optical fiber 10, is such that the intervals from the third gain peak to the sixth gain peak (4.4 THz or 4.1 THz) in the signal light wavelength band approximate the interval (4.4 THz) between each pumping light, which shows that the gain peaks are placed at equal intervals.

Accordingly, since the WDM signal light being propagated through the optical fiber 10 is Raman amplified according to the gain wavelength characteristics in which the peaks as described above are placed substantially at equal intervals, the inter-wavelength power deviation occurring in the WDM signal light after Raman amplified is also changed periodically. As a result, it becomes possible to flatten efficiently the inter-wavelength power deviation of the WDM signal light, using the gain equalizer 13 having the periodic filter characteristic in which the transmissivity becomes minimal (loss is maximal) at each gain peak wavelength of the Raman amplification and becomes maximal (the loss is minimal) at the wavelengths at midpoints of the gain peaks as shown in FIG. 4 described above. Since the gain equalizer 13 having a profile that is changed periodically can be realized easily using a typical periodic optical filter such as a Mach-Zehnder optical filter or the like, and such a periodic optical filter has a simple configuration and relatively small loss, it is possible to avoid that the gain equalizer becomes a factor leading to system performance degradation as in the conventional technique. Further, the periodic gain equalizer 13 as described above can equalize the gain in a very wide wavelength range. Therefore, it is no longer necessary that the WDM signal light is demultiplexed to be gain equalized for each required band and then multiplexed again, as in the conventional technique, thus it is possible to solve the problem of excessive losses in the demultiplexer and the multiplexer.

Note, in the description of the first embodiment, there has been shown the example in which the pumping light power is modulated so that the efficiency of the Raman amplification occurring between a plurality of pumping lights is reduced. However, the present invention is also effective for Raman amplifiers that do not modulate the pumping optical power, and it also holds true on other embodiments shown below.

Next, a second embodiment of the present invention will be described.

Figure 6:
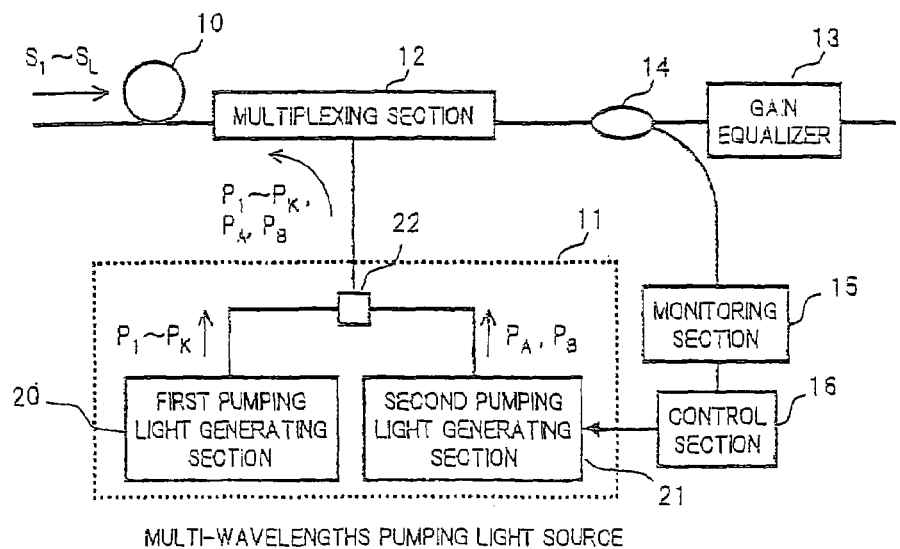
FIG. 6 is a block diagram showing a configuration of a Raman amplifier according to a second embodiment of the present invention.

FIG. 6 is a block diagram showing a configuration of a Raman amplifier of the second embodiment.

In FIG. 6, in the Raman amplifier of this embodiment, an optical coupler 14 and a monitoring section 15 for monitoring a wavelength characteristic of the WDM signal light power after Raman amplified, and a control section 16 that controls the second pumping light generating section 21 based on a detection result in the monitoring section 15 are provided, in addition to the configuration of the first embodiment as shown in FIG. 1 above. Other components other than the above are the same as those in the first embodiment, the description thereof is omitted here.

The optical coupler 14 branches, for example, a part of the WDM signal light to be sent from the multiplexing section 12 to the gain equalizer 13, to output the branched light to the monitoring section 15. The monitoring section 15 monitors a change in the optical power to the wavelength (the optical spectrum) in the WDM signal light branched by the optical coupler 14, to outputs a monitoring result to the control section 16.

The control section 16 judges a gain profile of the Raman amplification in the signal light wavelength band based on the monitoring result from the monitoring section 15, to control the power or wavelength of the second pumping lights generated by the second pumping light generating section 21 so that the gain profile approximates a previously set shape.

In the Raman amplifier of the first embodiment described above, if the intensity or wavelength of any of the plurality of pumping lights is changed due to the failure, aging or the like of the pumping light source, the gain profile of the Raman amplification is changed from the previously set gain profile in normal condition. Therefore, in the Raman amplifier of the second embodiment, by adopting the configuration described above is applied, the spectrum of the WDM signal light after Raman amplified is monitored by the monitoring section 15 and the gain profile of the Raman amplification actually obtained is judged by the control section 16 based on the monitoring result. Then, in the case where the judged actual gain profile is compared with the previously set gain profile and there is any change, the control section 16 optimizes the power or wavelength of the second pumping lights so that the original gain profile in a normal condition can be obtained.

More specifically, in the case where it is judged based on the actually obtained gain profile of the Raman amplification that for example, among the first pumping lights of four wavelengths (1409.0 nm, 1438.8 nm, 1469.8 nm and 1502.2 nm) shown in the first embodiment described above, the power of the pumping light $P_2$ of 1438.8 nm is reduced, the power of the pumping light $P_{A1}$, of 1353.0 nm that is positioned on the shorter wavelength side by approximately the wavelength width corresponding to the Raman shift frequency may be increased, or the power of the pumping light $P_{B1}$ of 1536.1 nm that is positioned on the longer wavelength side by approximately the wavelength width corresponding to the Raman shift frequency may be reduced. Further, if it is judged that the pumping light power of a plurality of wavelengths in the first pumping lights is changed, it is preferable to adjust the pumping light power of a plurality of wavelengths in the second pumping lights. Still further, when the second pumping lights are generated using a wavelength variable pumping light source, a control can be performed more flexibly and with higher accuracy, not only by controlling the pumping light power as described above but also by optimizing the wavelengths of the second pumping lights.

Next, a third embodiment of the present invention will be described.

Figure 7:
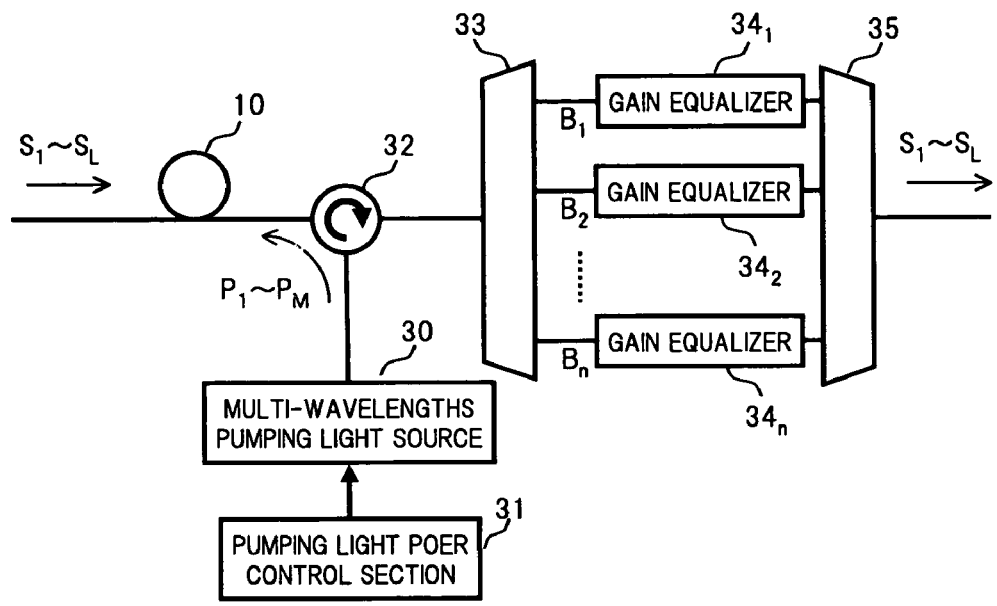
FIG. 7 is a block diagram showing a configuration of a Raman amplifier according to a third embodiment of the present invention.

FIG. 7 is a block diagram showing a configuration of a Raman amplifier of the third embodiment.

In FIG. 7, the Raman amplifier of this embodiment comprises: a multi-wavelengths pumping light source 30 that generates pumping lights for Raman amplifying, for example, the WDM signal light being propagated through the optical fiber 10 acting as the amplification medium; a pumping light power control section 31 that controls the pumping light power of each wavelength generated by the multi-wavelengths pumping light source 30; an optical circulator 32 giving the pumping lights output from the multi-wavelengths pumping light source 30 to the optical fiber 10; a demultiplexer 33 demultiplexing the WDM signal light that has been propagated through the optical fiber 10 and has passed through the optical circulator 32 into a plurality of wavelength bands; gain equalizers $34_1$, $34_2$, ... $34_n$ reducing, for each wavelength band, the inter-wavelength power deviation of the signal light demultiplexed into each wavelength band; and a multiplexer 35 multiplexing the signal lights output from the respective gain equalizer $34_1$-$34_n$ to output the multiplexed signal light.

Figure 8:
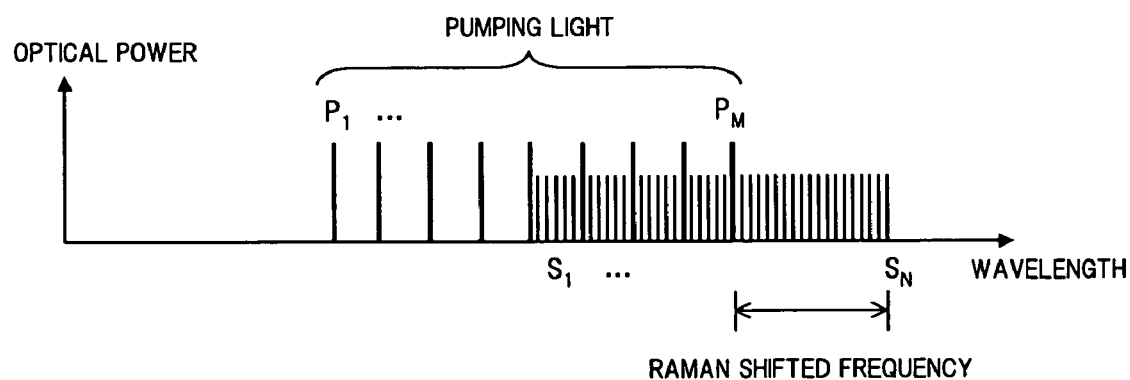
FIG. 8 is a diagram showing the wavelength allocation of signal lights and pumping lights in the third embodiment.

The WDM signal light being propagated through the optical fiber 10 similar to that in the first embodiment described above, contains a plurality of signal lights $S_1$-$S_n$ arranged at required wavelength spacing in a wavelength band corresponding to two times or more the Raman shift frequency, as shown in FIG. 8, for example.

As shown in FIG. 8, the multi-wavelengths pumping light source 30 generates the plurality of pumping lights $P_1$-$P_M$ of different wavelengths, arranged in the wavelength band of the signal lights $S_1$-$S_n$, which is shifted to the shorter wavelength side by approximately the wavelength width corresponding to the Raman shift frequency. The power of the pumping lights $P_1$-$P_M$ generated by the multi-wavelengths pumping light source 30 is controlled by the pumping light power control section 31 so that the minimal values of the Raman gain in the signal light wavelength band are substantially the same. The pumping lights $P_{1-PM}$ generated by the multi-wavelengths pumping light source 30 described above correspond to the first pumping lights in the first embodiment described above. Here, the pumping lights arranged on the longer wavelength side among the pumping lights $P_1$-$P_M$ is are mixed into a portion of the signal light wavelength band.

The optical circulator 32 gives the pumping lights from the multi-wavelengths pumping light source 30 to one end on the signal light output side of the optical fiber 10 and also transmits the WDM signal light that has been propagated through the optical fiber 10 and has been Raman amplified, to the demultiplexer 33 at the latter stage. Here, the pumping lights given to the optical fiber 10 by the optical circulator 32 are propagated through the optical fiber 10 in the direction opposite to the propagation direction of the WDM signal light.

The demultiplexer 33 demultiplexes the WDM signal light transmitted from the optical circulator 32 into a plurality of wavelength bands $B_1$, $B_2$, ..., $B_n$ to output from respective ports corresponding to the respective wavelength bands $B_1$-$B_n$. The wavelength bands $B_1$-$B_n$ are previously set so that a range where the wavelength deviation of the Raman gain is substantially the same is made one wavelength band, as described later. As a specific configuration of the demultiplexer 33, for example, it is possible to adopt a configuration in which a plurality of dielectric multilayer filters are connected in multi-stages.

The gain equalizers $34_1$-$34_n$ that are connected to respective output ports corresponding to the respective wavelength bands $B_1$-$B_n$ of the demultiplexer 33 and have respectively wavelength transmission (or loss) characteristics corresponding to the gain wavelength characteristics of the Raman amplification in the respective wavelength bands $B_1$-$B_n$, reduce the inter-wavelength optical power deviation occurring in the signal lights of wavelength bands $B_1$-$B_n$ demultiplexed by the demultiplexer 33, to generate flat signal lights, respectively. Since the range where the wavelength deviation of the Raman amplification is substantially the same is set for each of the wavelength bands $B_1$-$B_n$, it is possible to use the periodic optical filters of a simple configuration can be used for the gain equalizers $34_1$-$34_n$. An example of a specific configuration of each of gain equalizers $34_1$-$34_n$ will be described later.

The multiplexer 35 receives the signal lights output from the gain equalizers $34_1$-$34_n$ at respective ports thereof corresponding to the wavelength bands $B_1$-$B_n$ and multiplexes the signal lights in the wavelength bands $B_1$-$B_n$ to output the multiplexed signal light from one port thereof. For a specific configuration of the multiplexer 35, it is possible to adopt, for example, a configuration in which the plurality of dielectric multilayer filters are connected in multistages.

Next, an effect of the Raman amplifier of the third embodiment will be described.

As described in the problems (3) and (4) above, in the case where the WDM signal light having the wavelength band two times or more the Raman shift frequency is Raman amplified, since the gain wavelength characteristic thereof becomes a very complicated shape, the gain equalizer reducing the inter-wavelength power deviation of the Raman amplified signal light will also have a complicated configuration. As a result, a loss of the gain equalizer is increased, to be a factor leading to system performance degradation. Therefore, in the Raman amplifier of this embodiment, the power of the plurality of pumping lights $P_1$-$P_M$ is controlled so that the minimal values of the Raman gain are substantially the same in the signal light wavelength band and also the WDM signal light after Raman amplified is demultiplexed according to the plurality of wavelength bands $B_1$-$B_n$, in each of which the wavelength deviation of the Raman amplification is substantially the same, to equalize the gain of each wavelength band independently, a device of a simple configuration is made to be usable for the gain equalizer corresponding to each of the wavelength bands $B_1$-$B_n$, to suppress an increase of the loss.

To be specific, the detailed description will be made on the above with reference to an example of the case where the pumping lights $P_1$-$P_{13}$ of 13 wavelengths that are set in conditions identical to those in Table 1 shown above, are adopted as the pumping lights $P_1$-$P_M$ to be supplied from the multi-wavelengths pumping light source 30 via the optical circulator 32 to the optical fiber 10.

Figure 9:
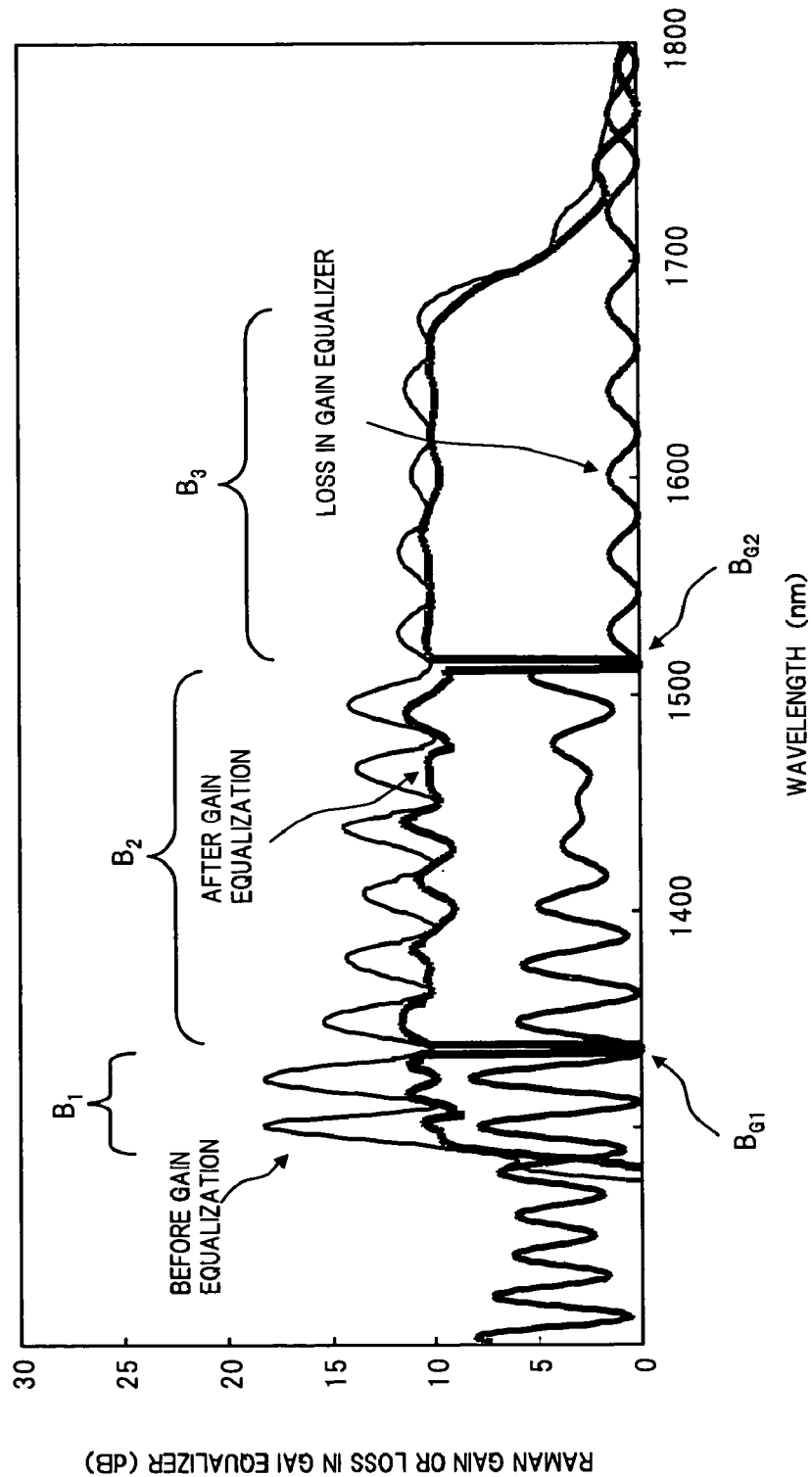
FIG. 9 is a diagram showing a specific example of a gain wavelength characteristic realized in the third embodiment.

FIG. 9 is an example of gain wavelength characteristic calculation in the case where the pumping lights $P_1$-$P_{13}$ as described above are adopted. In FIG. 9, a narrow curve represents the wavelength characteristic of the Raman gain before gain equalization, a thick curve represents the loss wavelength characteristics of the gain equalizer, and an extra thick curve represents the wavelength characteristic of the Raman gain after gain equalization.

In the specific example of FIG. 9, first, focusing attention on the wavelength characteristic of the Raman gain before gain equalization (the narrow curve), it can be understood that the minimal values of the Raman gain in the signal light wavelength band (the amplification band) are controlled to be the substantially same level $L_{MIN}$. Further, for the gain wavelength characteristic, it can also be understood that it is possible to set three wavelength bands $B_1$, $B_2$ and $B_3$, in each of which the deviation between the adjacent minimal and maximal values is substantially the same. More specifically, in this example, a guard band $B_{G1}$ having a wavelength range of 1334-1338 nm is set at a boundary between the wavelength bands $B_1$ and $B_2$, and a guard band $B_{G2}$ having a wavelength range of 1511.3-1515.3 nm is set at a boundary between the wavelength bands $B_2$ and $B_3$, to divide the entire amplification band into the three wavelength bands $B_1$-$B_3$.

Figure 37:
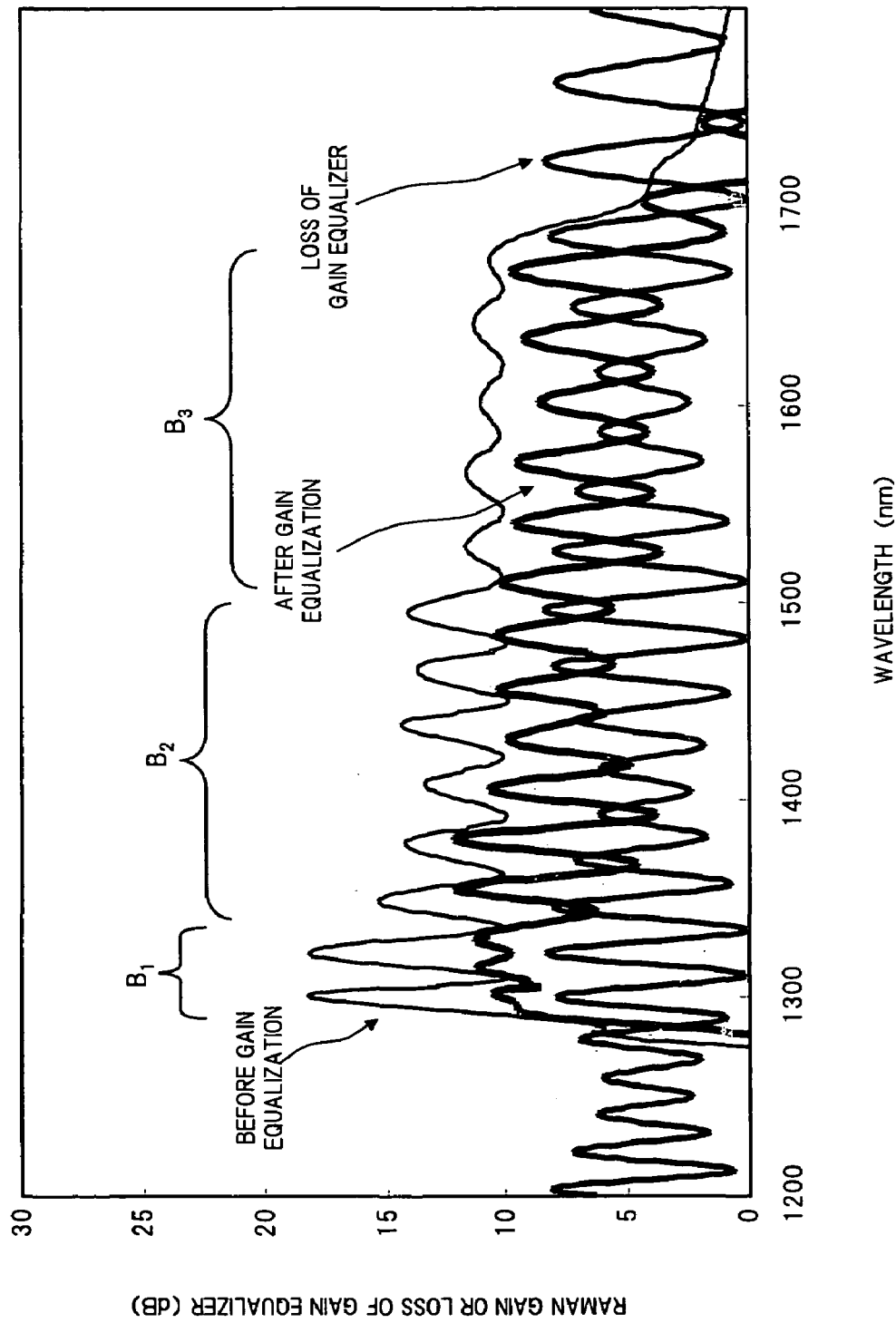
FIG. 37 is a diagram showing an example in which an optical filter having a periodic loss characteristic is applied to the gain wavelength characteristic of FIG. 36, to perform gain equalization.
Figure 38:
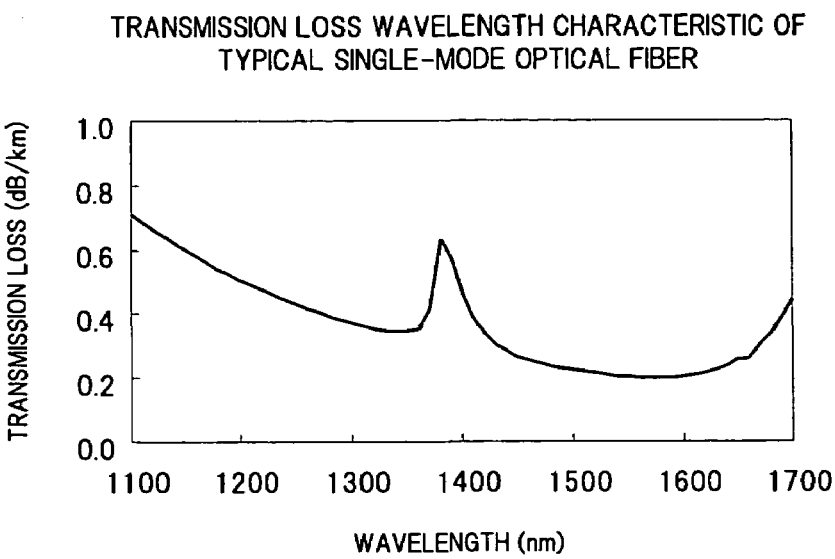
FIG. 38 is a graph showing a transmission loss wavelength characteristic of a single-mode optical fiber.

Next, focusing attention on the loss wavelength characteristic of the gain equalizers (the thick curve), in the gain equalizer $34_1$, corresponding to the wavelength band $B_1$ having the largest wavelength deviation of the Raman gain, for example, in a similar manner to that in the case shown in FIG. 37 above, a configuration is applied, in which a periodic optical filter having a loss wavelength characteristic of a period of 3.76 THz, an amplitude of 3.0 dB and a center frequency of 230.4 THz, and a periodic optical filter having a loss wavelength characteristic of a period of 4.41 THz, an amplitude of 1.2 dB and a center frequency of 231.1 THz, are used in combination, to realize the loss wavelength characteristic corresponding to the wavelength deviation of the Raman gain in the wavelength band $B_1$. Further, in the gain equalizer $34_2$ corresponding to the wavelength band $B_2$, for example, a configuration is applied, in which for example, a periodic optical filter having a loss wavelength characteristic of a period of 4.55 THz, an amplitude of 0.9 dB and a center frequency of 222.3 THz, and a periodic optical filter having a loss wavelength characteristic of a period of 4.33 THz, an amplitude of 1.0 dB and a center frequency of 200.5 THz, are used in combination, to realize the loss wavelength. characteristic corresponding to the wavelength deviation of the Raman gain in the wavelength band $B_2$. Still further, in the gain equalizer $34_3$ corresponding to the wavelength band $B_3$, one type of a periodic optical filter having a loss wavelength characteristic of a period of 4.4 THz, an amplitude of 0.7 dB and a center frequency of 187.2 THz is adopted, to realize the loss wavelength characteristic corresponding to the wavelength deviation of the Raman gain in the wavelength band $B_3$.

It can be understood that, by performing gain equalization using the gain equalizers $34_1$-$34_3$ with the simple configuration, in which each loss wavelength characteristic is optimized for each of the wavelength bands $B_1$-$B_3$, as described above, in the wavelength characteristic (the extra thick curve) after gain equalization, the wavelength deviation of the Raman gain is effectively reduced, and also the Raman gain of about 10 dB is secured, for all of the three wavelength bands $B_1$-$B_3$ as shown in FIG. 9.

Consequently, according to the Raman amplifier of the third embodiment, even in the case where a wide-band signal light is Raman amplified, the gain equalizers $34_1$-$34_3$ with the simple configuration are used to perform the gain equalization reliably over the entire signal light wavelength band. Further, since each of the gain equalizers $34_1$-$34_3$ having the simple configuration has a relatively low loss, it becomes possible to avoid that the gain equalizer becomes a factor leading to system performance degradation as in the conventional technique.

Figure 10:
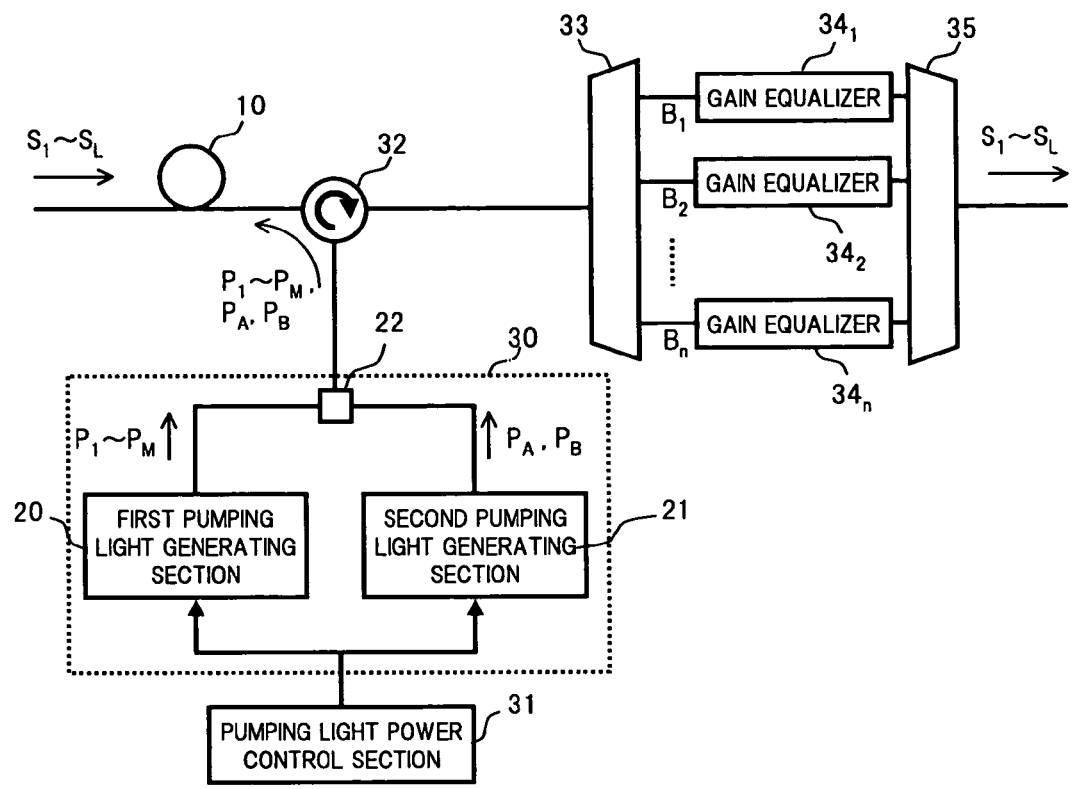
FIG. 10 is a block diagram showing a specific configuration in which the first and third embodiments are used together.
Figure 11:
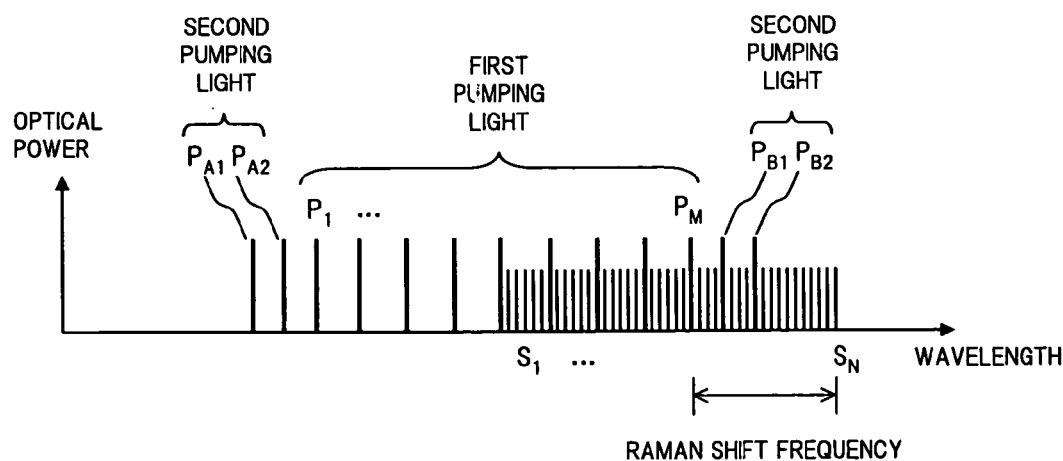
FIG. 11 is a diagram showing the wavelength allocation of signal lights and pumping lights in the configuration of FIG. 10.

Note, although the gain deviation of about 2.8 dB remains in the wavelength characteristic after gain equalization shown in the example of calculation of FIG. 9, it is possible to reduce the remaining gain deviation, for example, by further optimizing the wavelength and power of each pumping light, and also using the configuration of the first embodiment described above together so that the maximal values of the Raman gain are placed at equal wavelength spacing. FIG. 10 shows a specific example of the configuration in which the first and third embodiments are used together, and FIG. 11 shows the wavelength allocation of the signal lights and the pumping lights in the configuration example of FIG. 10.

Further, in the third embodiment, the description has been made on the configuration in which the pumping light power is controlled so that the minimal values of the Raman gain are substantially the same in the signal light wavelength band. However, the present invention is not limited to such a configuration and, for example, the pumping light power may be controlled so that the maximal values of the Raman gain are substantially the same. But, in the case where the maximal values are used as references, in order to make the level of the signal lights after gain equalization in the respective wavelength bands $B_1$-$B_n$ to be uniform, it is necessary to set the loss of the gain equalizer for the wavelength band having the small gain deviation, to be larger. Therefore, in order to perform gain equalization with a les loss, it is desirable to control the pumping light power so that the minimal values are substantially the same.

Next, a fourth embodiment of the present invention will be described.

In the third embodiment described above, the Raman amplified WDM signal light is demultiplexed into the plurality of wavelength bands $B_1$-$B_n$, to be gain equalized. In the fourth embodiment, an exemplary application will be described, wherein the band demultiplexing at the time of gain equalization is not performed and the gain equalization is performed collectively for the entire signal light wavelength band using one gain equalizer.

Figure 12:
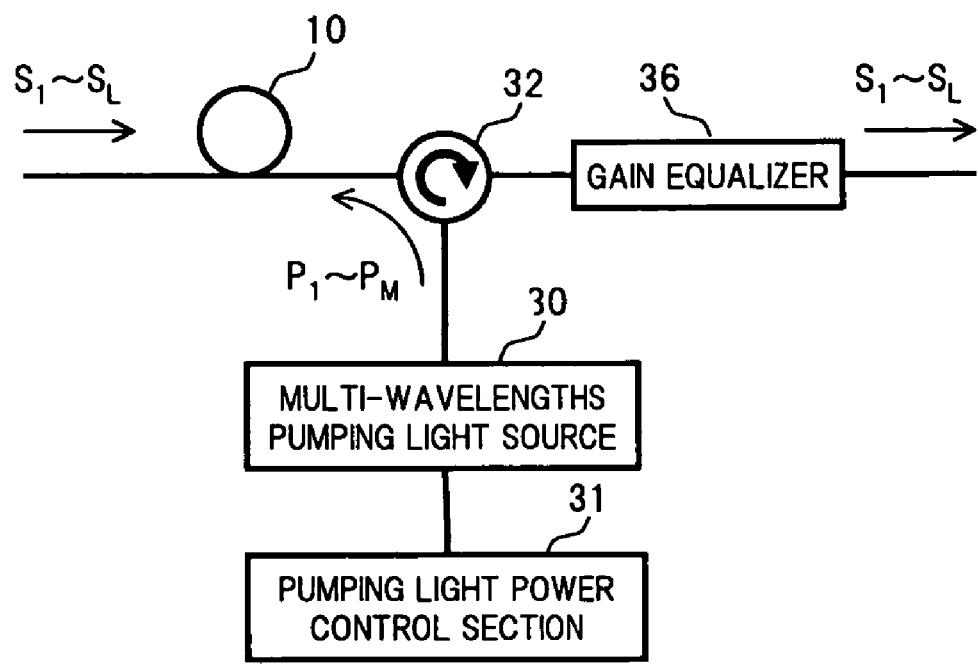
FIG. 12 is a block diagram showing a configuration of a Raman amplifier according to a fourth embodiment of the present invention.

FIG. 12 is a block diagram showing a configuration of a Raman amplifier of the fourth embodiment.

In FIG. 12, the configuration of the Raman amplifier of this embodiment differs from that in the third embodiment in that, in stead of the pumping light power control section 31 used in the third embodiment, there is provided a pumping light power control section 31' that controls the power of pumping lights $P_1$-$P_M$ generated by the multi-wavelengths pumping light source 30 so that the maximal and minimal points of the gain wavelength characteristic of Raman amplification in the signal light wavelength band are placed substantially in uniformity in a positive region and a negative region with a previously set reference gain value as a boundary, and thereby, the necessity of band demultiplexing at the time of gain equalization is eliminated to perform collectively the gain equalization for the entire signal light wavelength band by a single gain equalizer 36. Note, the multi-wavelengths pumping light source 30, the optical circulator 32 and the optical fiber 10 as well as the wavelength allocation of the signal lights $S_1$-$S_n$ and the pumping lights $P_1$-$P_M$ are similar to those in the third embodiment. However, the configuration of this embodiment is effective when the WDM signal light being propagated through the optical fiber 10 contains the plurality of signal lights $S_1$-$S_N$ arranged at required wavelength spacing in the wavelength band substantially corresponding to the Raman shift frequency or more.

Figure 13:
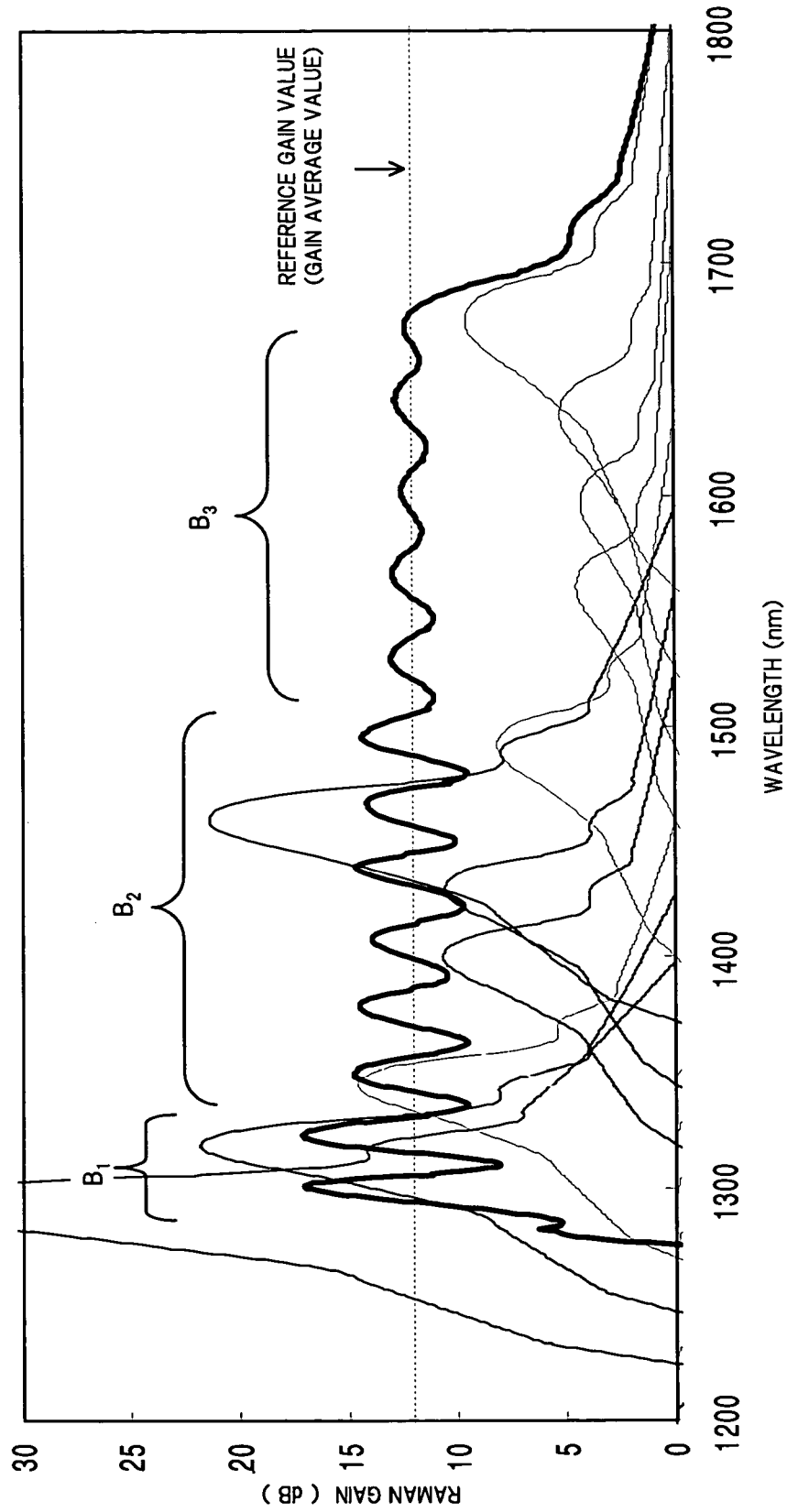
FIG. 13 is a diagram showing a wavelength characteristic of a Raman gain before gain equalization in the fourth embodiment.

FIG. 13 is a diagram showing, in an enlarged manner, the signal light wavelength band (the-amplification band) portion in an example of gain wavelength characteristic before gain equalization in the Raman amplifier described above. The gain wavelength characteristic is an example of calculation in the case where the pumping lights $P_1$-$P_{13}$ of 13 wavelengths that are set in conditions identical to those in Table 1 shown above are adopted as the pumping lights $P_1$-$P_M$ output from the multi-wavelengths pumping light source 30.

Figure 14:
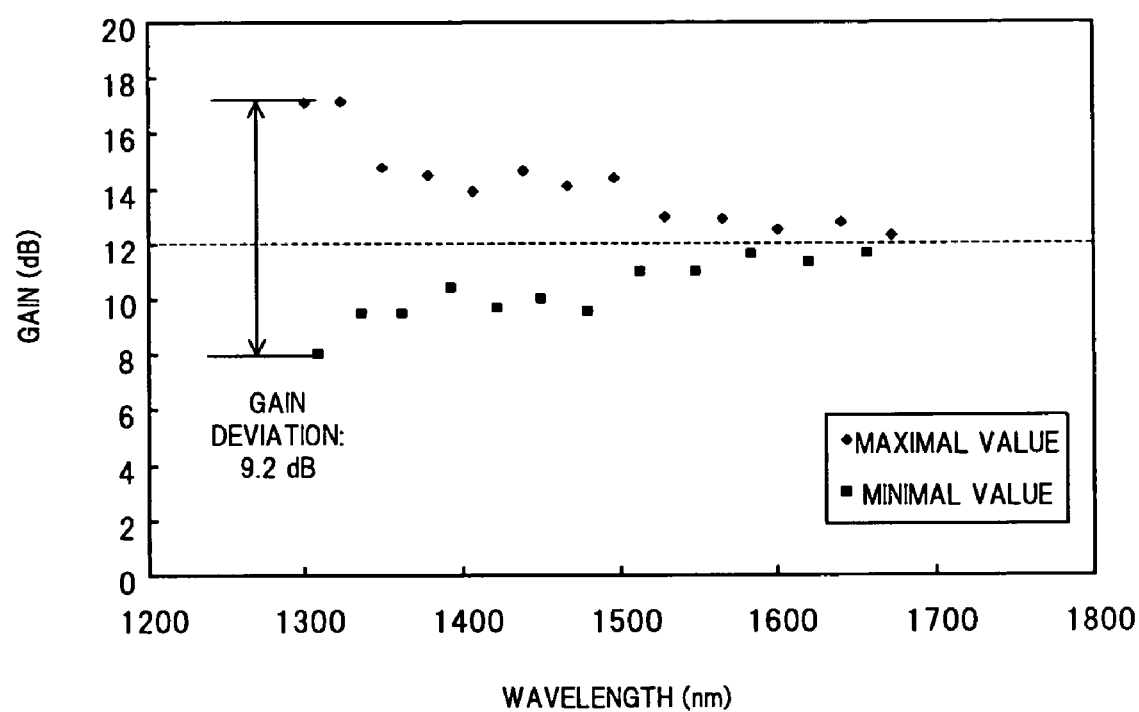
FIG. 14 is a diagram showing the distribution of maximal and minimal values of the Raman gain in FIG. 13.

In the example of calculation shown in FIG. 13, the reference gain value is set to 12 dB and a region exceeding 12 dB at the top of the figure is defined as the positive region and a region not exceeding 12 dB at the bottom of the figure is defined as the negative region. Then, the pumping light power control section 31' controls the power of the pumping lights $P_1$-$P_M$ generated by the multi-wavelengths pumping light source 30, to realize a condition in which the maximal and minimal points of the Raman gain in the signal light wavelength band (the amplification band) are placed substantially in uniformity in the positive and negative regions, in other words, a condition in which an average value of the Raman amplification for the signal light wavelength band is substantially equal to the reference gain value. The data shown in Table 4 below summarizes the maximal and minimal values of the Raman amplification shown in FIG. 13, and FIG. 14 is a plot of the data of Table 4, wherein the horizontal axis represents the wavelength and the vertical axis represents the gain.

TABLE 4

| Maximal Wavelength (nm) | Maximal Frequency (THz) | Maximal Value (dB) | Minimal Wavelength (nm) | Minimal Frequency (THz) | Minimal Value (dB) |
|---|---|---|---|---|---|
| 1300.62 | 230.50 | 17.09 | 1309.71 | 228.90 | 8.02 |
| 1323.00 | 226.60 | 17.16 | 1335.97 | 224.40 | 9.46 |
| 1349.20 | 222.20 | 14.74 | 1362.07 | 220.10 | 9.45 |
| 1378.99 | 217.40 | 14.50 | 1392.44 | 215.30 | 10.41 |
| 1407.48 | 213.00 | 13.92 | 1422.17 | 210.80 | 9.64 |
| 1439.23 | 208.30 | 14.64 | 1450.37 | 206.70 | 10.02 |
| 1466.70 | 204.40 | 14.12 | 1480.46 | 202.50 | 9.52 |
| 1495.97 | 200.40 | 14.34 | 1513.34 | 198.10 | 11.02 |
| 1528.77 | 196.10 | 12.98 | 1547.72 | 193.70 | 11.00 |
| 1566.31 | 191.40 | 12.88 | 1584.53 | 189.20 | 11.56 |
| 1601.46 | 187.20 | 12.50 | 1621.38 | 184.90 | 11.34 |

TABLE 4-continued

| Maximal Wavelength (nm) | Maximal Frequency (THz) | Maximal Value (dB) | Minimal Wavelength (nm) | Minimal Frequency (THz) | Minimal Value (dB) |
|---|---|---|---|---|---|
| 1640.90 | 182.70 | 12.76 | 1658.14 | 180.80 | 11.64 |
| 1672.95 | 179.20 | 12.33 | | | |

For the gain wavelength characteristics described above, again, in a manner similar to that shown in FIG. 9 above, the three wavelength bands $B_1$, $B_2$ and $B_3$ can also be set so that the deviation between the adjacent minimal and maximal values is substantially the same (FIG. 13). However, in this embodiment, the gain equalization is not performed for each of the wavelength bands $B_1$-$B_3$, but is performed collectively using a single gain equalizer in which a plurality of periodic optical filters is combined together.

Figure 15:
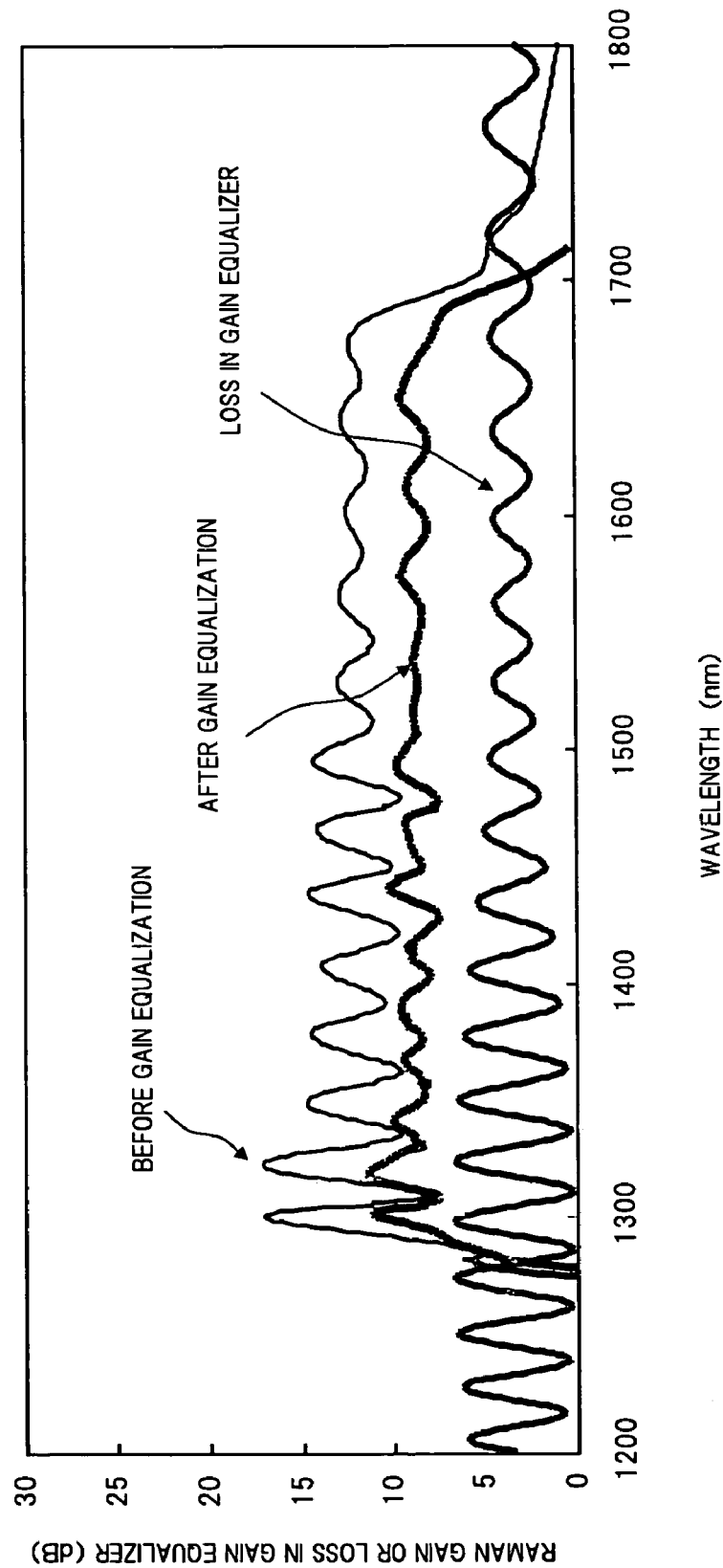
FIG. 15 is a diagram showing a specific example of a gain wavelength characteristic realized in the fourth embodiment.

FIG. 15 is an example of calculation to obtain a loss wavelength characteristic of the gain equalizer 36 to be applied to the gain wavelength characteristic of the Raman amplification described above and a wavelength characteristic after gain equalization.

The loss wavelength characteristic of the gain equalizer 36 shown in FIG. 15 (a thick curve) comprises, for example, three types of periodic optical filters. More specifically, a periodic optical filter having a loss wavelength characteristic of a period of 4.6 THz, an amplitude of 0.92 dB and a center frequency of 230.5 THz, a periodic optical filter having a loss wavelength characteristics of a period of 4.2 THz, an amplitude of 0.6 dB and a center frequency of 230.5 THz, and a periodic optical filter having a loss wavelength characteristic of a period of 4.4 THz, an amplitude of 1.9 dB and a center frequency of 226.6 THz, are combined together to constitute the gain equalizer 36, to realize the loss wavelength characteristic corresponding to the wavelength deviation of the Raman gain over the entire signal light wavelength band. Since the gain equalization of the WDM signal light after Raman amplified is performed collectively using the gain equalizer 36 described above, in the wavelength characteristic after gain equalization, the wavelength deviation of the Raman gain is reduced effectively over the entire signal light wavelength band and also the Raman gain of about 10 dB is ensured, as shown by an extra thick curve in FIG. 15.

Consequently, according to the Raman amplifier of the fourth embodiment, even in the case where a wide-band signal light is Raman amplified, it is possible to perform reliably the gain equalization over the entire signal light wavelength band using the single gain equalizer 36 in which the periodic optical filters with the simple configuration are combined together. Since such a gain equalizer 36 has a relatively low loss, it becomes possible to avoid that the gain equalizer becomes a factor leading to system performance degradation as in the conventional technique.

Note, although the gain deviation remains in the wavelength characteristic after gain equalization shown in the example of calculation of FIG. 15, it is possible to reduce the above remaining gain deviation, for example, by further optimizing the wavelength and power of each pumping light and by using the configuration of the first embodiment described above together so that the maximal values of the Raman gain are placed at equal wavelength spacing.

Next, a fifth embodiment of the present invention will be described.

In the first to fourth embodiments described above, in the case of applying the wavelength allocation in which the signal lights are mixed with the pumping lights in the wavelength band, a Rayleigh scattered light of each pumping light supplied to the optical fiber 10 passes through the multiplexing section 12 (the optical circulator 32) to be transmitted along with the WDM signal light to latter stages. The Rayleigh scattered light also exists in the wavelength band of the WDM signal light, and therefore, may be accumulated in the process of transmission of the WDM signal light to degrade the system performance. The applicant of this invention has proposed that it is effective to apply an optical filter to reject the Rayleigh scattered light for preventing the performance degradation due to such a Rayleigh scattered light (refer to Japanese Patent Application 2001-390366.) Thus, in the fifth embodiment, an example of improvement will be described wherein the optical filter for rejecting the Rayleigh scattered light as described above is applied.

Figure 16:
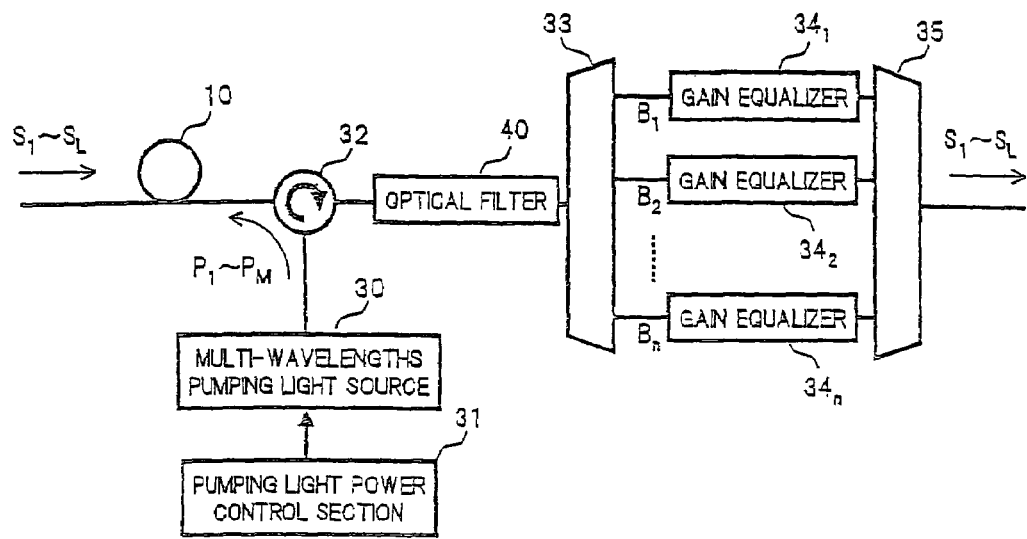
FIG. 16 is a block diagram showing a configuration of a Raman amplifier according to a fifth embodiment of the present invention.

FIG. 16 is a block diagram showing a configuration of a Raman amplifier of the fifth embodiment.

In FIG. 16, the Raman amplifier of this embodiment is constituted such that, for example, in addition to the configuration of the third embodiment as shown in FIG. 7 above, there is provided an optical filter 40 for rejecting the Rayleigh scattered light between the optical circulator 32 and the demultiplexer 33.

Figure 17:
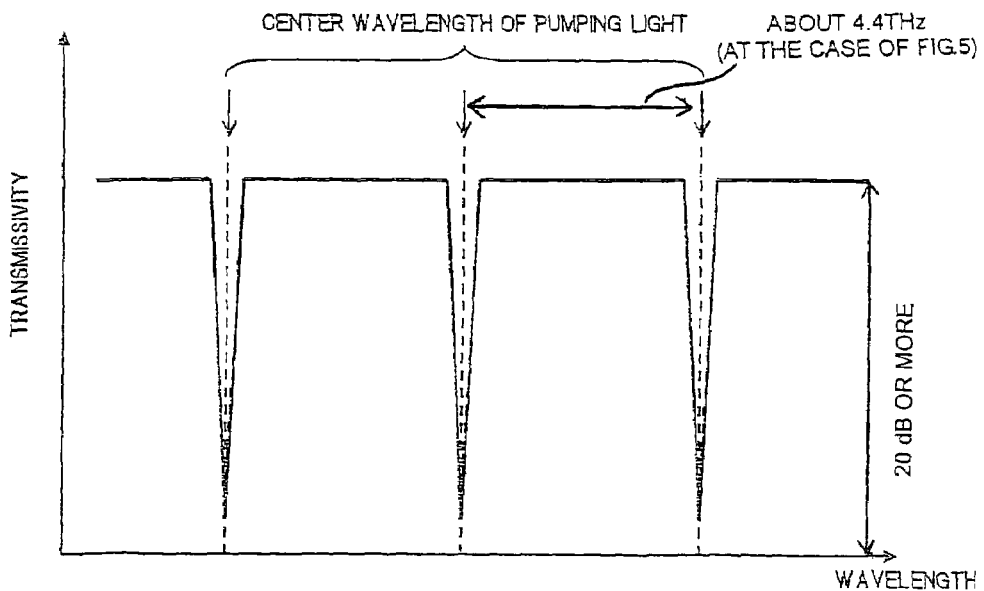
FIG. 17 is a diagram showing an example of a wavelength transmission characteristic of an optical filter for rejecting a Rayleigh scattered light in the fifth embodiment.

As the optical filter 40, it is possible to use, as shown in FIG. 17 for example, a periodic notch filter, the transmissivity of which is reduced sharply at a wavelength corresponding to the center wavelength of each of the pumping lights $P_1$-$P_M$.

In the Raman amplifier configured as described above, the Rayleigh scattered light of each of the pumping lights $P_1$-$P_M$ supplied from the multi-wavelengths pumping light source 30 via the optical circulator 32 to the optical fiber 10 passes through the optical circulator 32 to be input to the optical filter 40 along with the WDM signal light. In the optical filter 40, since the Rayleigh scattered light having the wavelength coinciding with each of the pumping lights $P_1$-$P_M$ is prevented from passing therethrough, only the WDM signal light arranged at wavelengths different from those of the pumping lights $P_1$-$P_M$ is sent to the demultiplexer 33. Thus, since the Rayleigh scattered light of each of the pumping lights $P_1$-$P_M$ is no longer transmitted to the latter stages, the system performance can be improved.

Figure 18:
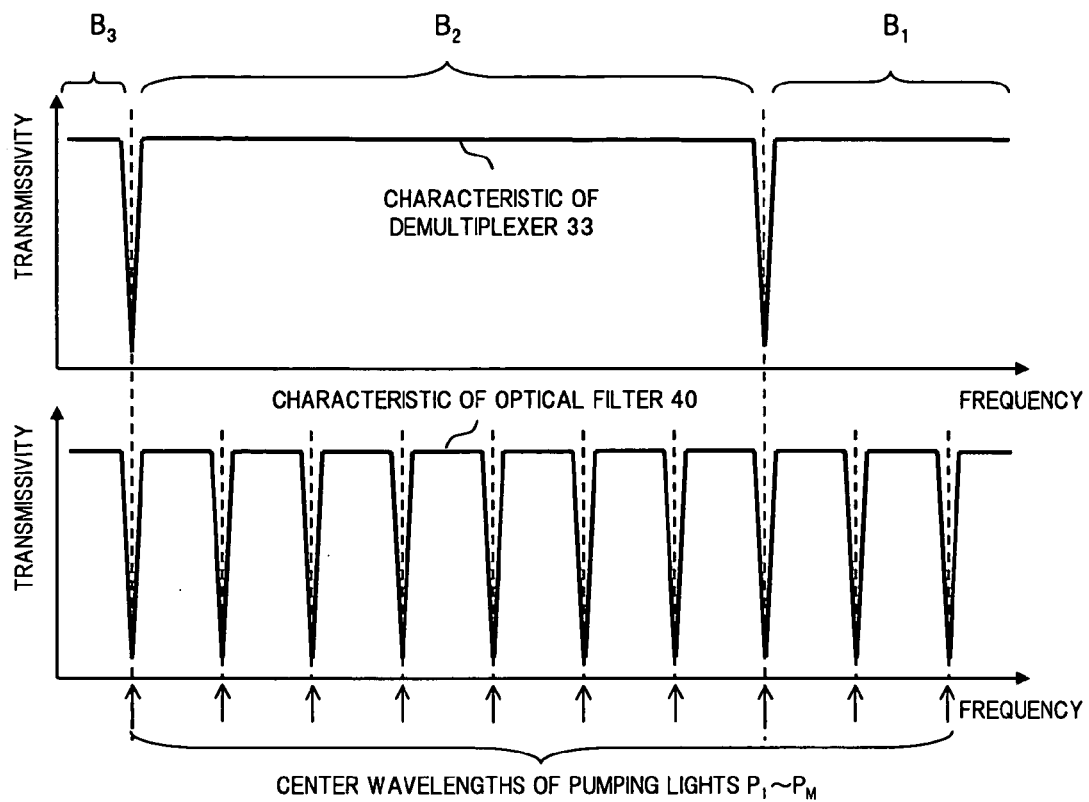
FIG. 18 is a diagram showing an example of preferred wavelength transmission characteristics of an optical filter and a demultiplexer in the fifth embodiment.

Further, in the case where the frequency interval between each of the pumping lights $P_1$-$P_M$ is set to a value of 1/Raman shift frequency (an integer+½), as shown in FIG. 18, the loss peak frequency where the transmissivity of the demultiplexer 33 becomes minimal (at the top of FIG. 18) coincides with the loss peak frequency where the transmissivity of the optical filter 40 for rejecting the Rayleigh scattered light becomes minimal (at the bottom of FIG. 18). Therefore, the Rayleigh scattered light can be suppressed and the gain equalization can be performed for each of the wavelength bands $B_1$-$B_n$, while employing the amplification band of the Raman amplifier efficiently.

Note, in the fifth embodiment, the example has been shown, in which in addition to the configuration of the third embodiment shown in FIG. 7, there is provided the optical filter 40 for rejecting the Rayleigh scattered light. However, it is possible to apply the optical filter for rejecting the Rayleigh scattered light to the embodiments other than the third embodiment in a similar manner.

Figure 19:
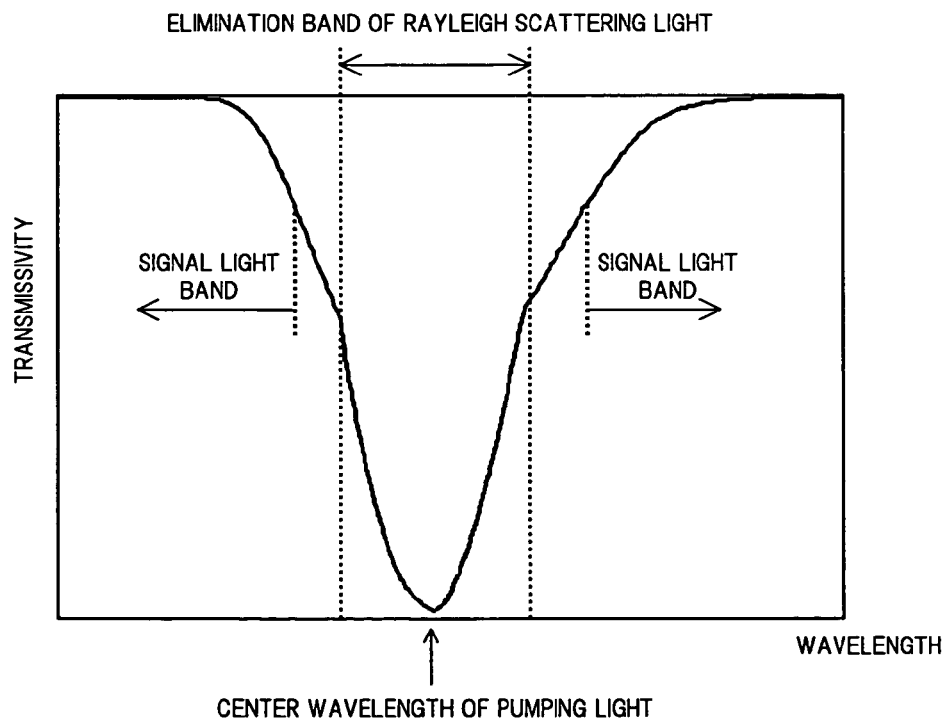
FIG. 19 is a diagram showing a wavelength transmission characteristic of an optical filter equipped with functions for rejecting a Rayleigh scattered light and performing gain equalization in an application example of the fifth embodiment.

Further, as an exemplary application of the fifth embodiment described above, it is possible to provide the optical filter for rejecting the Rayleigh scattered light with a function for performing the gain equalization so that the rejection of Rayleigh scattered light and the gain equalization can be performed by a single optical filter. FIG. 19 is a diagram showing, in an enlarged manner, an essential part of a wavelength transmission characteristic of the optical filter as described above. If it is possible to realize an optical filter having a characteristic in which the transmissivity is reduced sharply at a wavelength corresponding to the center wavelength of each of the pumping lights, and the transmissivity is changed in a shape corresponding to the wavelength characteristic of the Raman gain in the signal light wavelength bands positioned before and after the wavelength corresponding to the center wavelength as shown in FIG. 19, the rejection of Rayleigh scattered light and the gain equalization can be performed collectively.

Figure 20:
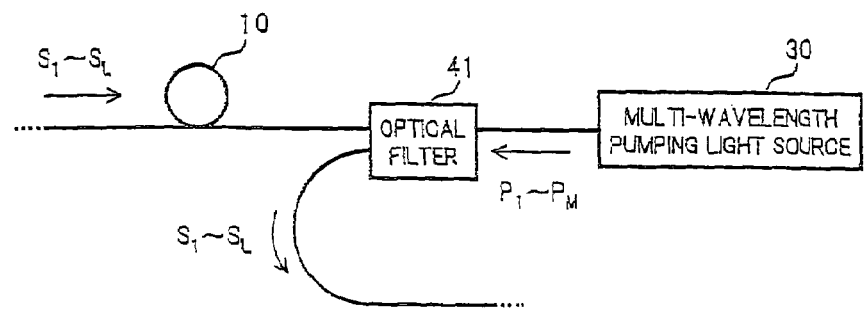
FIG. 20 is a block diagram showing an essential configuration of another application example of the fifth embodiment.
Figure 21:
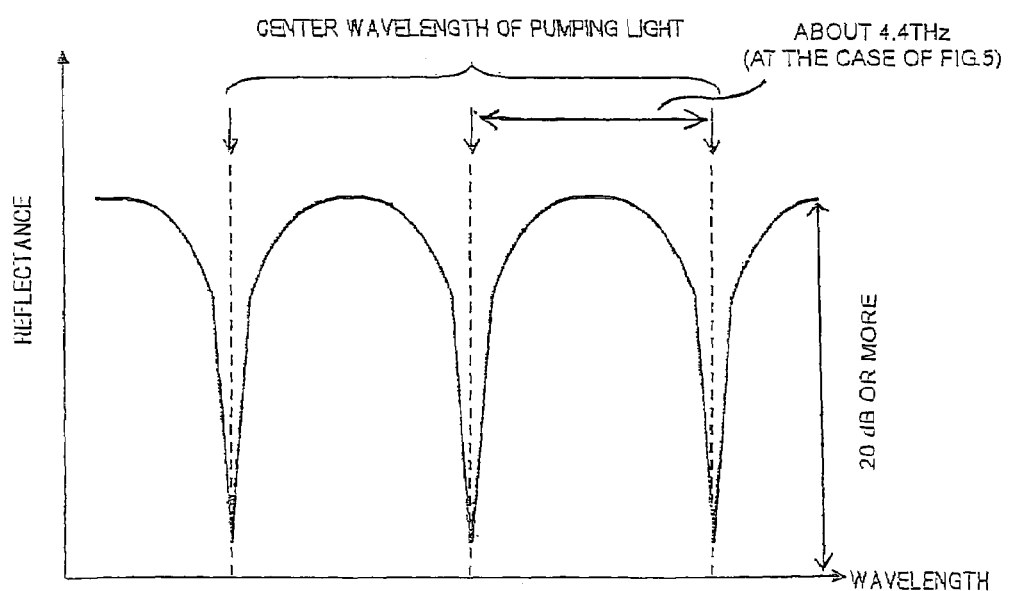
FIG. 21 is a diagram showing a wavelength characteristic of reflectance of an optical filter in FIG. 20.

Still further, as another exemplary application of the fifth embodiment described above, as shown in an essential configuration of FIG. 20, it is also effective to use an optical filter 41 having a characteristic to transmit only wavelength bands in the vicinity of the pumping lights, to give the pumping lights $P_1$-$P_M$ output from the multi-wavelengths pumping light source 30 to the optical fiber 10 (the amplification medium). FIG. 21 shows a preferable specific example of a change in reflectance to a wavelength in the optical filter 41 described above. If the optical filter 41 having the wavelength characteristic as shown in FIG. 21 is used, it is possible to narrow the spectra of the pumping lights $P_1$-$P_M$ given from the multi-wavelengths pumping light source 30 to the optical fiber 10. Further, since a reflectance characteristic of a wavelength range positioned between the center wavelengths of the pumping lights $P_1$-$P_M$ is inverse to the Raman gain profile, the gain equalization of the Raman amplified signal lights $S_1$-$S_N$ can also be performed at the same time. Further, since the Rayleigh scattered light generated in the optical fiber 10 never again passes through the optical filter 41 to be transmitted to the latter stages, it is also possible-to reject the Rayleigh scattered light using the optical filter 41. Accordingly, it becomes possible to improve the system performance by the narrowing of the pumping light spectra and, at the same time, to realize the simple configuration and low loss of the Raman amplifier.

Next, a sixth embodiment of the present invention will be described.

Figure 22:
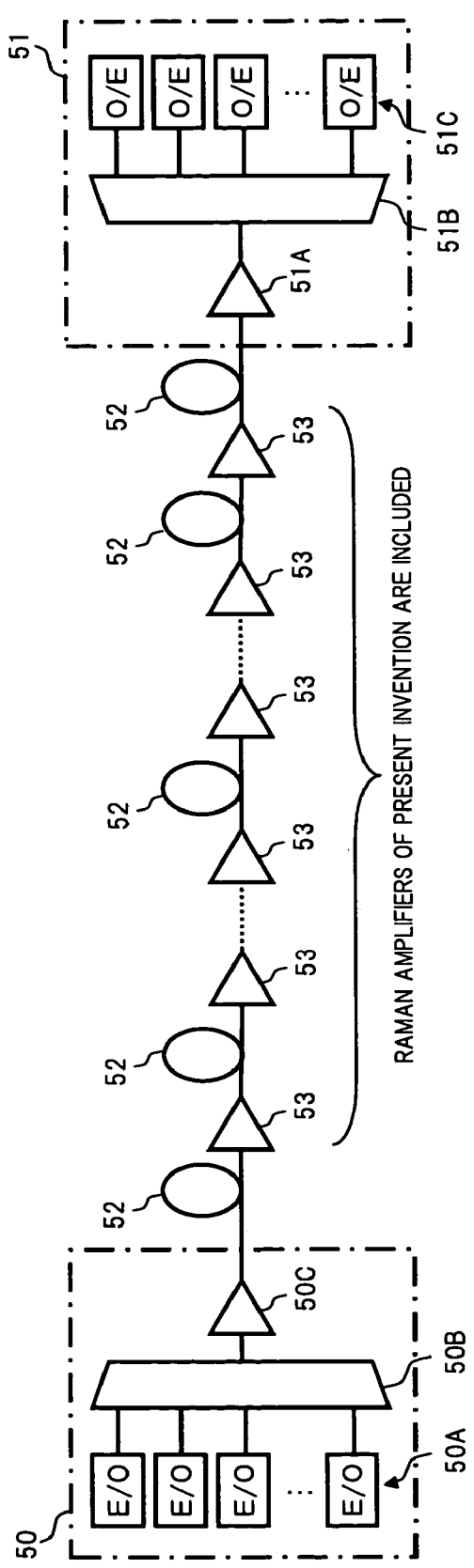
FIG. 22 is a block diagram showing a configuration of an optical transmission system according to a sixth embodiment of the present invention.

FIG. 22 is a block diagram showing a configuration of an optical transmission system according to the sixth embodiment of the present invention.

In FIG. 22, in the present optical transmission system, in which, for example, a plurality of optical repeater stations 53 are disposed on an optical transmission path 52 connecting between an optical transmission station 50 and an optical reception station 51, and a WDM signal light sent out from the optical transmission station 50 to the optical transmission path 52 is repeatedly transmitted to the optical reception station 51 while being amplified by each optical repeater station 53, each optical repeater station 53 comprises any one of the Raman amplifiers in the first to fifth embodiments described above. Here, the optical transmission path connecting between each optical repeater station 53 is utilized as an amplification medium for Raman amplification.

In the optical transmission station 50, signal lights of different wavelengths generated by a plurality of optical transmitter (E/O) 50A are multiplexed by a multiplexer 50B to generate the WDM signal light, and the generated WDM signal light is amplified to the required level by a post-amplifier 50C to be sent out to the optical transmission path 52. On the other hand, in the optical reception station 51, the WDM signal light repeatedly transmitted from the optical transmission station 50 via the optical transmission path 52 and each optical repeater station 53 is amplified to the required level by a pre-amplifier 51A and, then, demultiplexed into signal lights of respective wavelength by a demultiplexer 51B and the demultiplexed signal lights are received by optical receivers (O/E) 51C corresponding to the respective wavelengths.

In the optical transmission system as described above, the WDM signal light transmitted from the optical transmission station 50 to the optical transmission path 52 is propagated through the optical transmission path 52 in each repeating block to be repeatedly transmitted to the optical reception station 51 while being Raman amplified. At this time, since the inter-wavelength power deviation occurring in the WDM signal light according to the wavelength characteristic of the Raman amplification in each repeating block is equalized by the gain equalizer having a simple configuration and low loss, it becomes possible to realize the excellent system performance.

Figure 23:
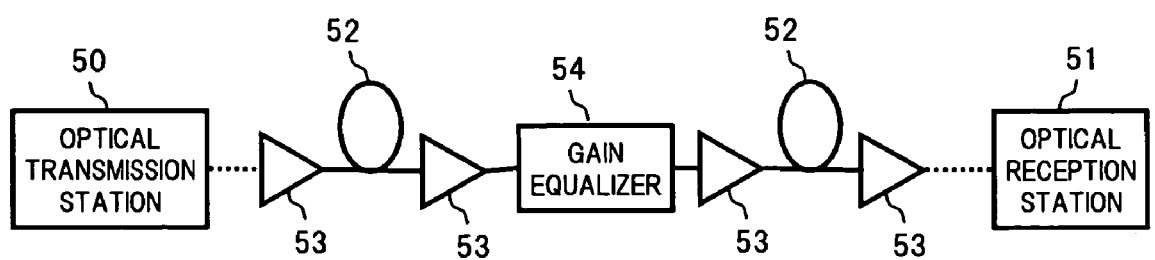
FIG. 23 is a block diagram showing another configuration example in relation to the sixth embodiment.
Figure 24:
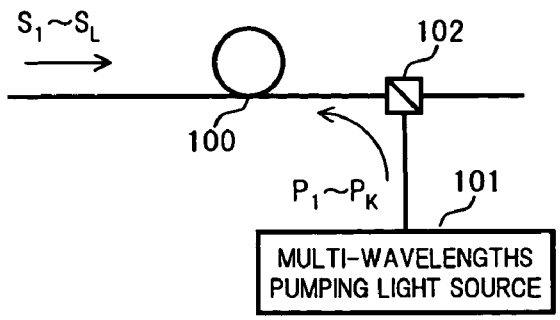
FIG. 24 is a diagram showing a configuration example of a conventional Raman amplifier.
Figure 25:
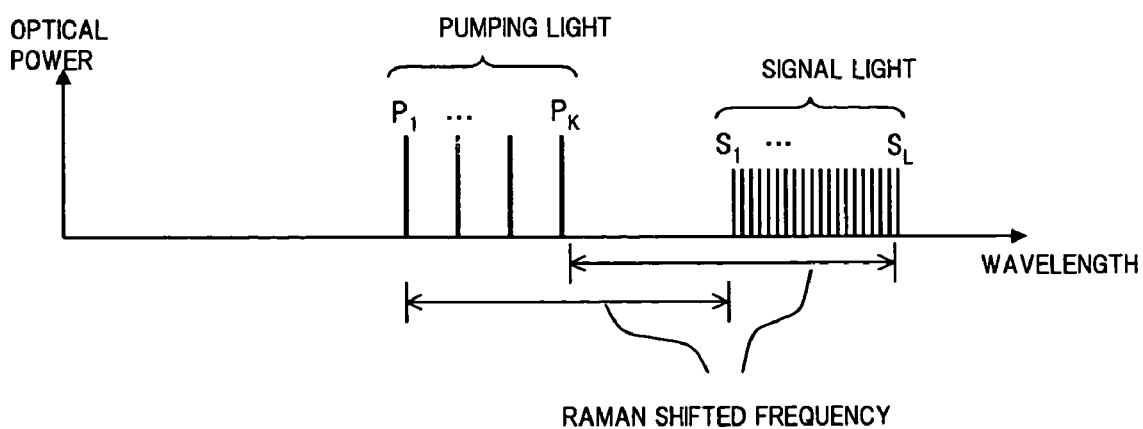
FIG. 25 is a diagram showing the wavelength allocation of signal lights and pumping lights in the Raman amplifier of FIG. 24.
Figure 26:
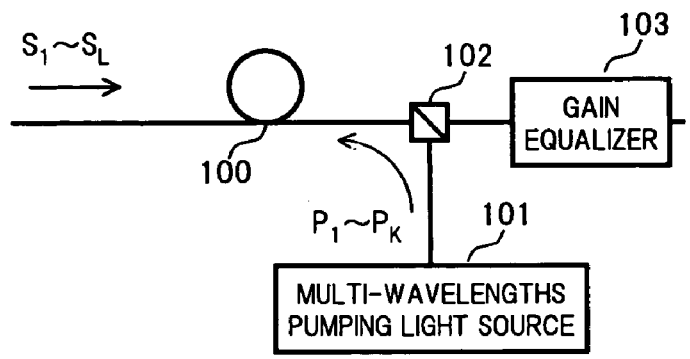
FIG. 26 is a diagram showing a configuration example in which a gain equalizer is applied to the Raman amplifier of FIG. 24.
Figure 27:
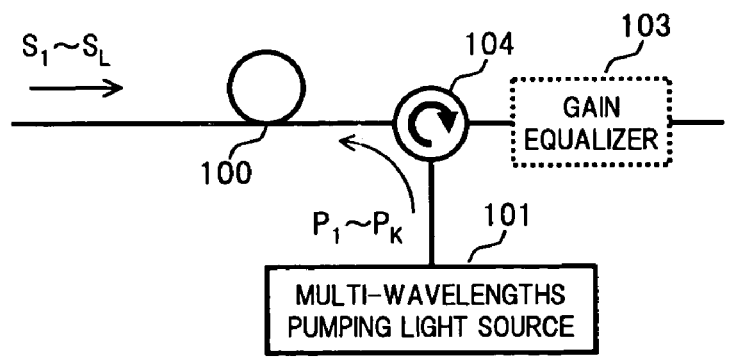
FIG. 27 is a diagram showing another configuration example of the conventional Raman amplifier.
Figure 28:
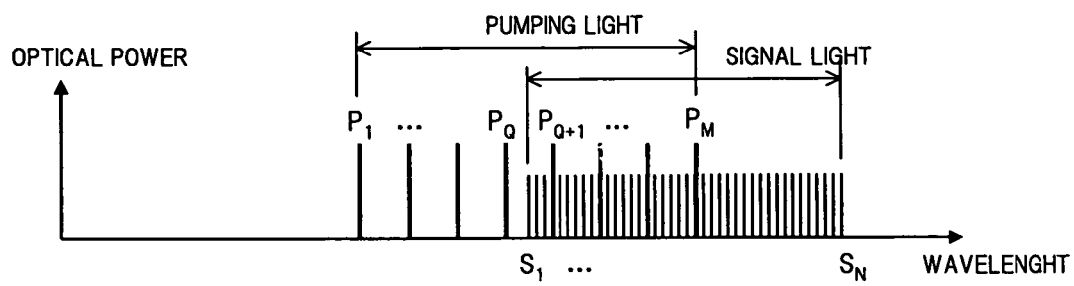
FIG. 28 is a diagram showing the wavelength allocation of signal lights and pumping lights in the Raman amplifier of FIG. 27.

Further, in the optical transmission system of the sixth embodiment described above, as shown in FIG. 23, for example, a gain equalizer 54 compensating for the accumulated gain deviation that has not been equalized in each repeating block to remain collectively for the required number of times of repeating operations, may be provided separately from the gain equalizer in the Raman amplifier of each optical repeater station 53. Thus, it becomes possible to further improve the system performance.

Next, a seventh embodiment of the present invention will be described.

Figure 39:
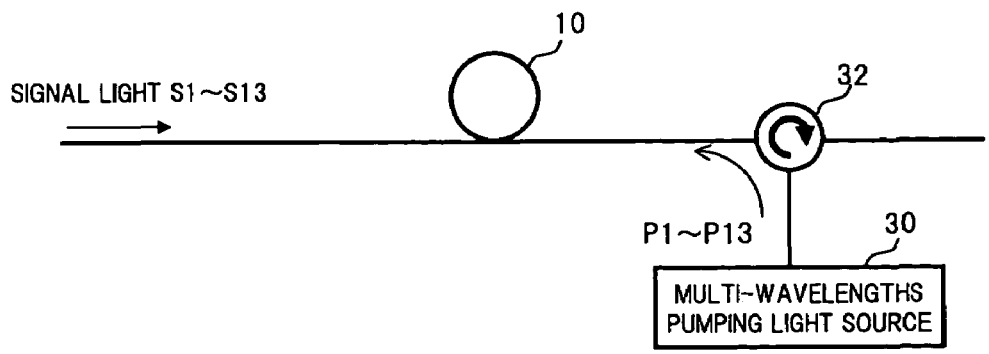
FIG. 39 is a diagram showing a basic configuration of a Raman amplifier according to seventh and eighth embodiments.
Figure 40:
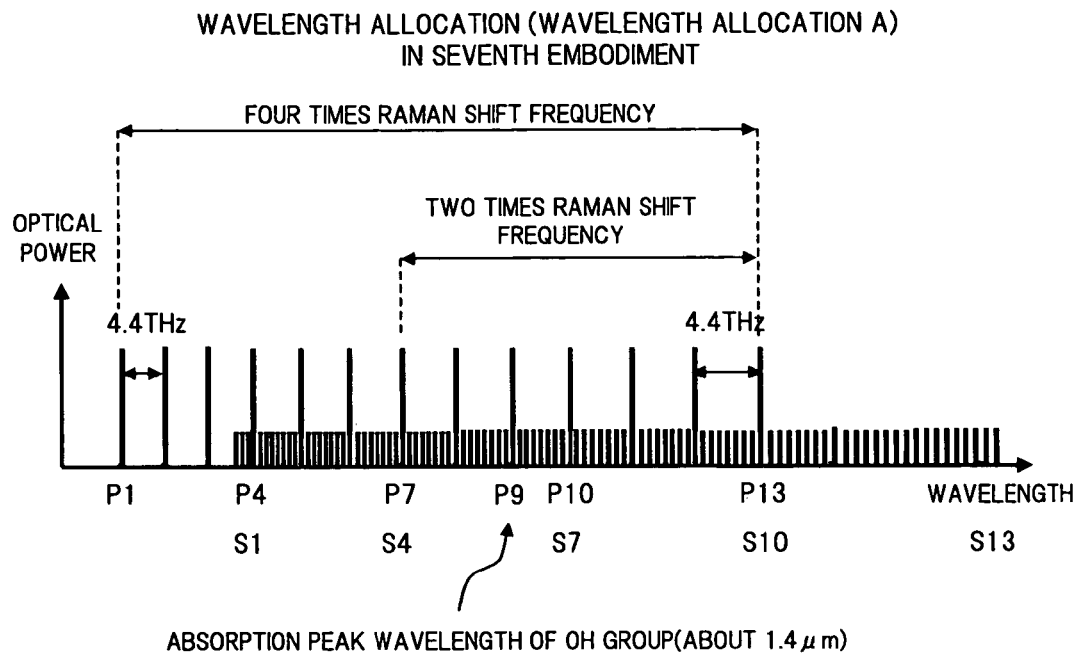
FIG. 40 is a diagram showing the wavelength allocation (wavelength allocation A) in the seventh embodiment.
Figure 41:
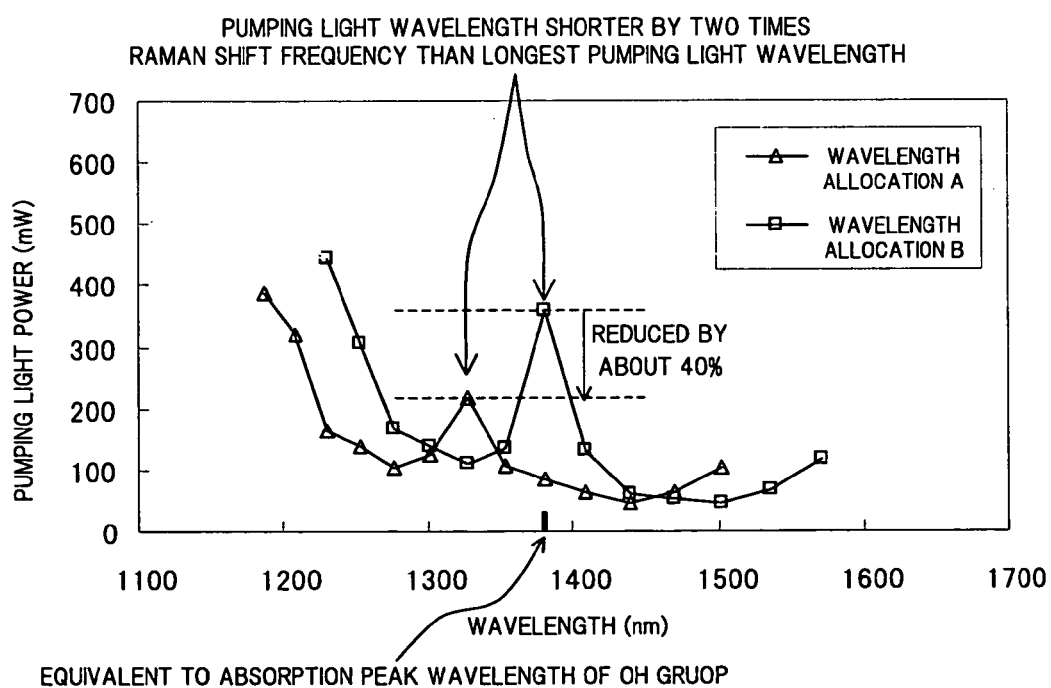
FIG. 41 is a graph showing an effect in the seventh embodiment.

A configuration of the seventh embodiment and the wavelength allocation are shown in FIG. 39 and FIG. 40, respectively. The wavelength allocation shown in FIG. 40 is made to be the wavelength allocation A. The longest pumping light wavelength P13 is positioned on a shorter wavelength side by the Raman shift frequency than the longest signal light wavelength S13, and the shortest pumping light wavelength P1 is positioned on a shorter wavelength side by the Raman shift frequency than the shortest signal light wavelength S1. Here, one example is shown where the pumping lights of 13 waves are arranged at equal spacing of 4.4 THz (⅓ times the Raman shift frequency 13.2 THz). However, the Raman shift frequency, the pumping light wavelengths, the number of pumping light wavelengths and the pumping light wavelength spacing are not limited thereto, and also the signal light wavelengths, the number of signal light wavelengths and the signal light wavelength spacing are not limited thereto. The consideration is made on the case where a wavelength of OH-absorption loss possessed by the optical fiber corresponds to a pumping light wavelength P9. Namely, this is the case where a pumping light wavelength P7, which is shorter by two times the Raman shift frequency than the longest pumping light wavelength, is allocated on a shorter wavelength side by ⅔ times the Raman shift frequency than the OH-absorption loss . FIG. 41 shows the pumping light powers of the respective pumping light wavelengths for the case where the pumping light wavelength P7 and the wavelength of OH-absorption loss possessed by the optical fiber are not coincident with each other (wavelength allocation A) and the case where the pumping light wavelength P7 and the wavelength of OH-absorption loss possessed by the optical fiber are coincident with each other (wavelength allocation B). Here, there is no correlation between the pumping light wavelength and the pumping light power. The pumping light power of the pumping light wavelength, which is shorter by two times the Raman shift frequency than the longest pumping light wavelength, can be reduced by about 40% in the wavelength allocation A with respect to the wavelength allocation B, and the total required pumping light power can be reduced by 10%. Namely, it is effective that the pumping light wavelength, which is shorter by two times the Raman shift frequency than the longest pumping light wavelength, is not coincident with the wavelength of OH-absorption loss possessed by the optical fiber.

Next, an eighth embodiment of the present invention will be described.

Figure 42:
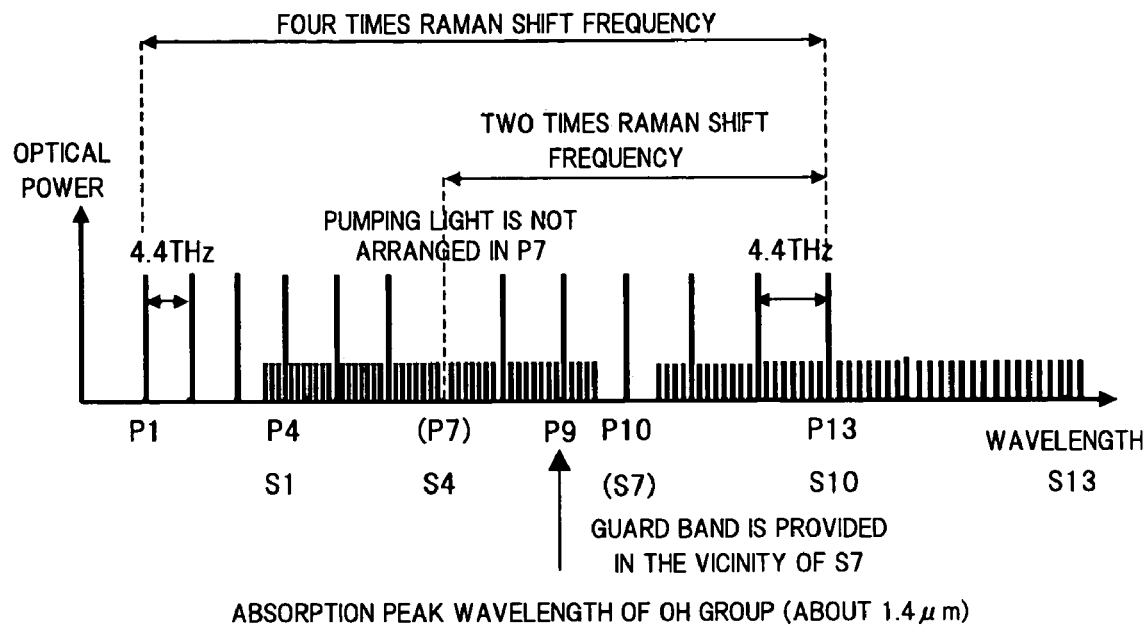
FIG. 42 is a diagram showing the wavelength allocation (wavelength allocation C) in the case where a guard band is provided.
Figure 43:
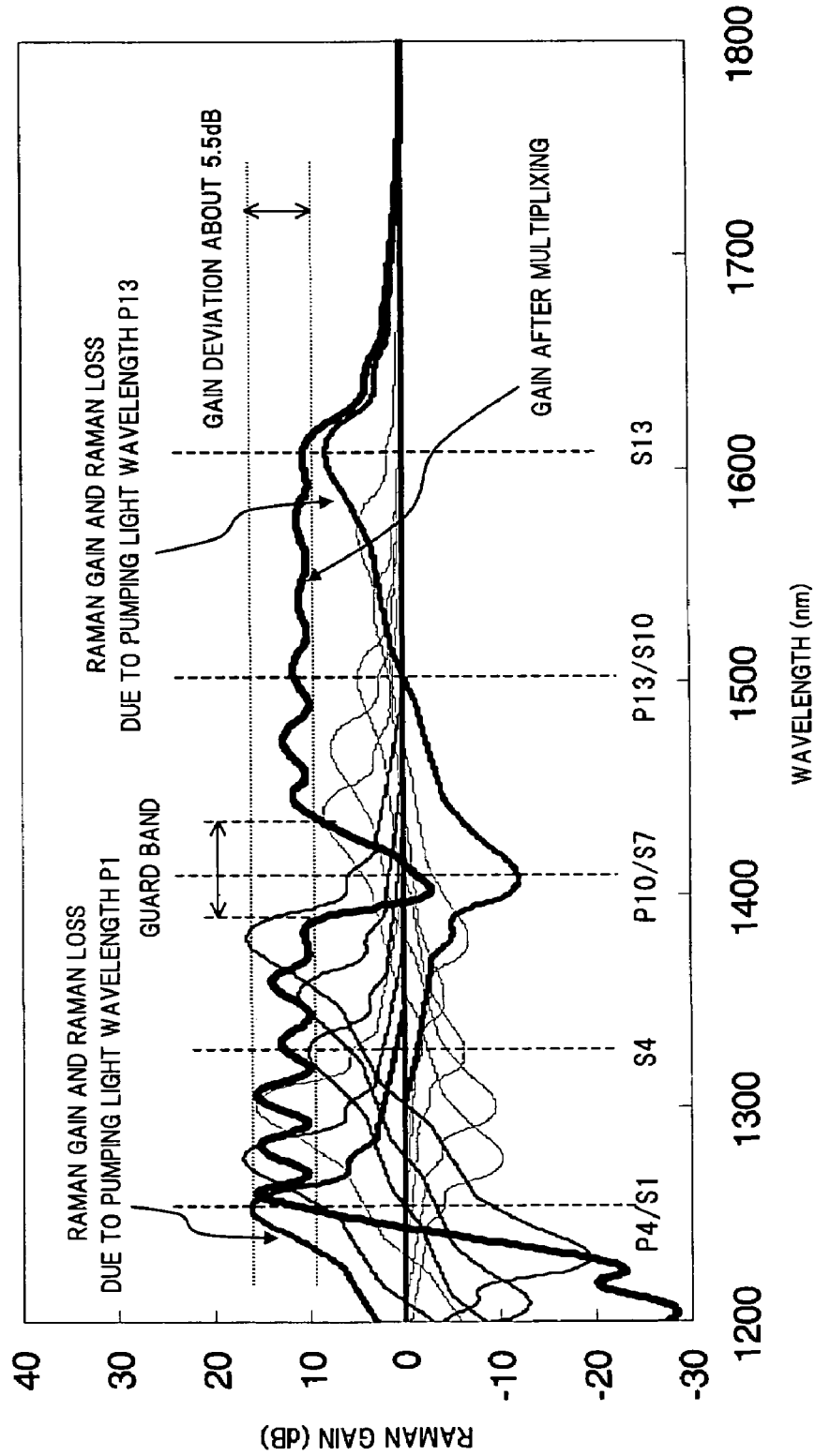
FIG. 43 is a graph showing a gain wavelength characteristic in the case where the guard band is provided.

The wavelength allocation and a gain wavelength characteristic in the eighth embodiment are shown in FIG. 42 and FIG. 43, respectively. A configuration of the eighth embodiment is the same as that of the seventh embodiment. The wavelength allocation shown in FIG. 42 is made to be the wavelength allocation C. Here, in order to provide an invalid wavelength band (guard band) within the signal light wavelength band, the pumping light P7 is not arranged on the shorter wavelength side by two times the Raman shift frequency than the longest pumping light wavelength P13. Each of the pumping light wavelengths, the number of pumping light wavelengths and the pumping light wavelength spacing is merely an example, and is not limited thereto. Also, each of the signal light wavelengths, the number of signal light wavelengths and the signal light wavelength spacing is merely an example, and is not limited thereto.

Figure 44:
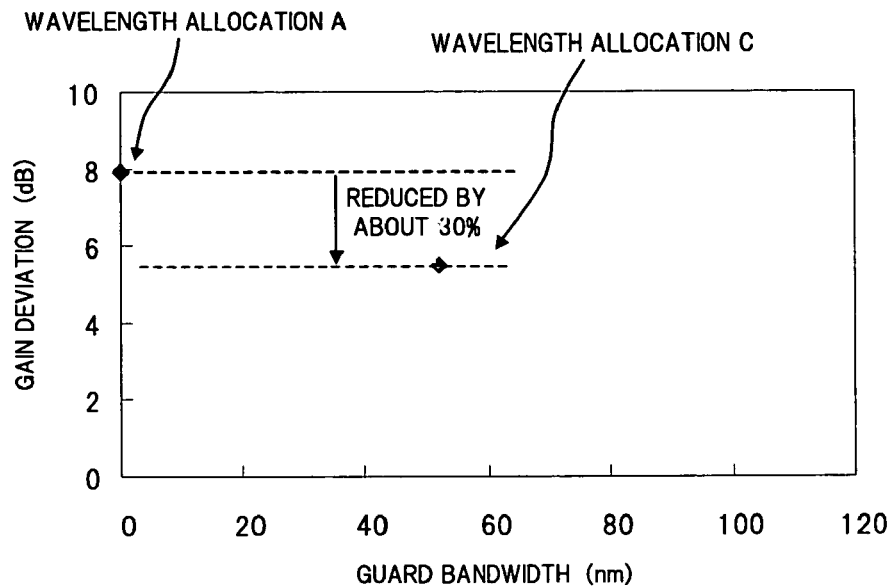
FIG. 44 is a graph showing the reduction of gain deviation by the provision of the guard band.
Figure 45:
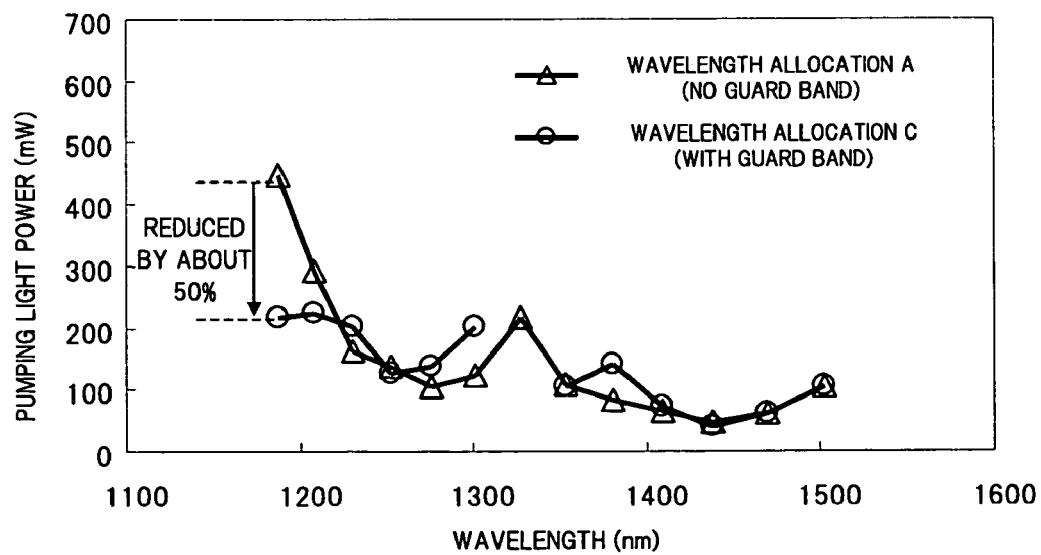
FIG. 45 is a graph showing the pumping light power in the case where the guard band is provided.

As shown in FIG. 44, in the wavelength allocation C where the guard band is provided, the gain deviation can be reduced by about 30%, compared with the wavelength allocation A where a guard band is not provided. Further, it is understood that, as shown in FIG. 45, a Raman loss due to the pumping light wavelength P7 no longer exist, and therefore, the pumping light power of the pumping light wavelength P1 can be reduced by about 50%.

Figure 46:
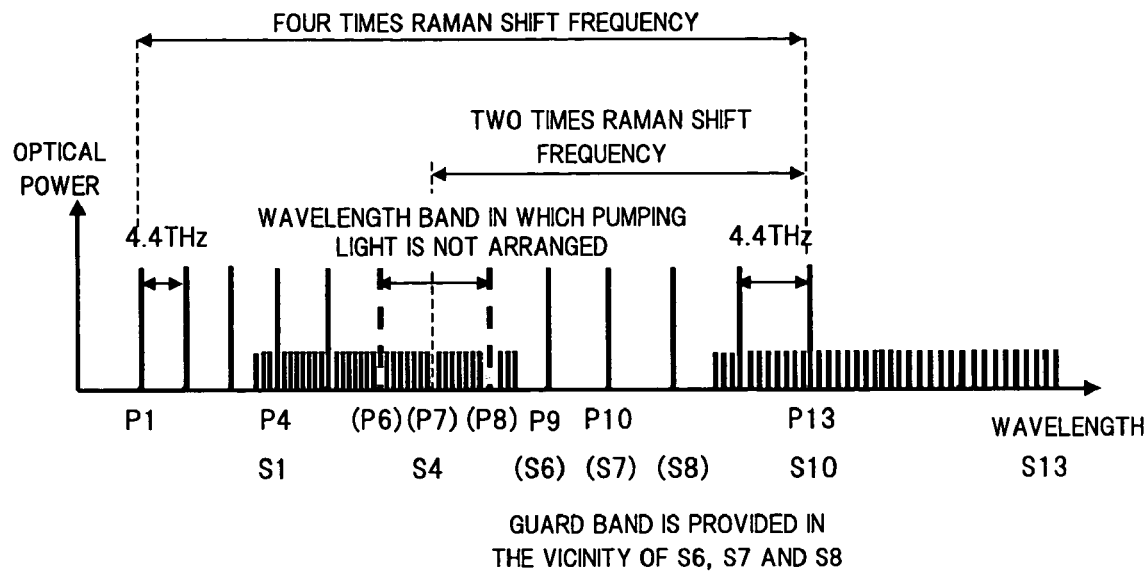
FIG. 46 is a diagram showing the wavelength allocation (wavelength allocation D) in the case where the guard band is provided.
Figure 47:
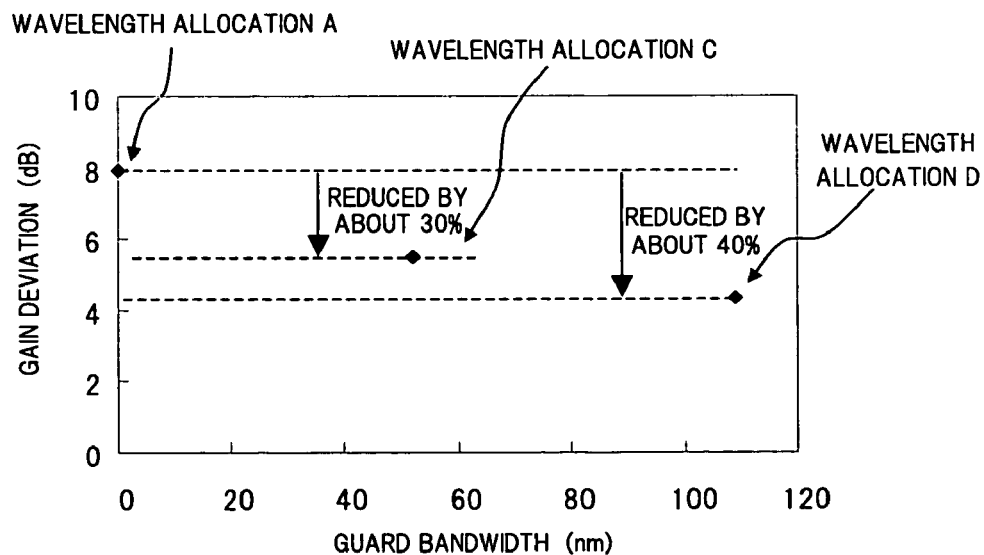
FIG. 47 is a graph showing the reduction of gain deviation in the case where the guard band is provided.

As the pumping light wavelength, which is no longer allocated due to the provision of the guard band, although the example of one wavelength, the pumping light wavelength P7, has been shown, a plurality of pumping light wavelengths in the vicinity of the pumping light wavelength P7 may be combined with each other. For example, FIG. 46 shows the case where the pumping light wavelengths are not allocated on a shorter wavelength side and a longer wavelength side being apart by ⅓ times the Raman shift frequency from the pumping light wavelength, which is shorter by two times the Raman shift frequency than the longest pumping light wavelength. Such wavelength allocation is made to be the wavelength allocation D. As shown in FIG. 47, the wavelength allocation D can reduce the gain deviation by about 40% compared to the wavelength allocation A.

Note, such a case is further effective where the pumping light wavelength, which is shorter by even number times the Raman shift frequency than the longest pumping light wavelength, is coincident with the wavelength of OH-absorption loss possessed by the optical fiber, and is not emitted.

Further, the example in which the pumping light modulation is performed, has been described. However, even in the case where the pumping light modulation is not performed, since an influence by the Raman loss on the shorter wavelength side can be reduced by providing the guard band, it is possible to reduce the pumping light power of the shortest pumping light wavelength. Moreover, it is also considered that the gain deviation can be reduced.

What is claimed is:

1. A Raman amplifier for supplying pumping lights to an amplification medium through which is propagated a wavelength division multiplexed signal light obtained by multiplexing a plurality of signal lights of different wavelengths, to amplify the wavelength division multiplexed signal light due to a Raman effect, comprising:

a first pumping light generating section that generates a plurality of pumping lights arranged at equal wavelength spacing in a first wavelength band which is shifted from a signal light wavelength band where said plurality of signal lights are arranged to a shorter wavelength side in accordance with the wavelength width corresponding to a Raman shift frequency;

a second pumping light generating section that generates pumping lights of one or more wavelengths arranged in a second wavelength band on at least one of a shorter wavelength side and a longer wavelength side than the first wavelength band, the wavelength and power of which are set so that peak wavelength spacing of a Raman gain in the signal light wavelength band is substantially equal to each other; and a multiplexing section that multiplexes the pumping lights generated respectively by said first and second pumping light generating sections to supply the multiplexed pumping light to said amplification medium.

2. A Raman amplifier according to claim 1, further comprising;

a gain equalizer having the periodicity corresponding to the peak wavelength spacing of the Raman gain in the signal light wavelength band, to reduce the wavelength deviation of the power of the Raman amplified wavelength division multiplexed signal light.

3. A Raman amplifier according to claim 1, further comprising:

a monitoring section that monitors a wavelength characteristic of the power of the wavelength division multiplexed signal light that has been propagated through said amplification medium and has been Raman amplified; and a control section that controls at least of one of the wavelength and power of the pumping light generated by said second pumping light generating section according to a change in a wavelength characteristic of the Raman gain in the signal light wavelength band, judged based on the monitoring result of said monitoring section.

4. A Raman amplifier according to claim 1, wherein the wavelength allocation is adopted, in which the signal light wavelength band is narrower than a wavelength band corresponding to the Raman shift frequency, and a signal light wavelength band and a pumping light wavelength band are separated from each other.

5. A Raman amplifier according to claim 1, wherein the wavelength allocation is adopted, in which the signal light wavelength band has a wavelength width substantially corresponding to the Raman shift frequency or more, and the pumping lights are mixed into the signal light wavelength band.

6. A Raman amplifier according to claim 5, further comprising; an optical filter rejecting a Rayleigh scattered light of each pumping light mixed in the signal light wavelength band.

7. A Raman amplifier according to claim 5, further comprising;

an optical filter having the periodicity corresponding to peak wavelength spacing of the Raman gain in the signal light wavelength band, to reduce the wavelength deviation of the Raman gain and, at the same time, to reject a Rayleigh scattered light of each pumping light mixed in the signal light wavelength band.

8. A Raman amplifier according to claim 5, further comprising;

an optical filter having the periodicity corresponding to peak wavelength spacing of the Raman gain in the signal light wavelength band, to reduce the wavelength deviation of the Raman gain and, at the same time, to narrow the spectrum of each pumping light.

9. An optical transmission system comprising a Raman amplifier in claim 1.

10. An optical transmission system according to claim 9, wherein said Raman amplifier is provided in each of a plurality of optical repeater stations disposed on an optical transmission path connecting between optical terminal stations.

11. An optical transmission system according to claim 10, further comprising;

a gain equalizer compensating for the gain deviation of the Raman gain that has not been equalized to remain in each repeater section, for each of a plurality of repeating sections.

* * * * *

UNITED STATES PATENT AND TRADEMARK OFFICE
CERTIFICATE OF CORRECTION

PATENT NO. : 7,242,519 B2
APPLICATION NO. : 10/812104
DATED : July 10, 2007
INVENTOR(S) : Kenichi Torii et al.

It is certified that error appears in the above-identified patent and that said Letters Patent is hereby corrected as shown below:

Title Page, Column 2 item [74] (Attorney, Agent or Firm), Line 1, change "Stass" to --Staas--

Column 29, Line 10, change "that generates" to --configured to generate--.

Column 29, Line 17, change "that generates" to --configured to generate--.

Column 29, Line 25, change "that multiplexes" to --configured to multiplex--.

Signed and Sealed this

Thirteenth Day of May, 2008

JON W. DUDAS
*Director of the United States Patent and Trademark Office*